United States Patent
Smit

(10) Patent No.: US 12,440,389 B2
(45) Date of Patent: Oct. 14, 2025

(54) EARPLUGS WITH CORD

(71) Applicant: CHRONOTECH (PTY) LTD, Stellenbosch (ZA)

(72) Inventor: Nicolaas Hendrik Smit, Stellenbosch (ZA)

(73) Assignee: CHRONOTECH (PTY) LTD, Stellenbosch (ZA)

( * ) Notice: Subject to any disclaimer, the term of this patent is extended or adjusted under 35 U.S.C. 154(b) by 1054 days.

(21) Appl. No.: 17/055,292

(22) PCT Filed: May 22, 2019

(86) PCT No.: PCT/IB2019/054224
§ 371 (c)(1),
(2) Date: Nov. 13, 2020

(87) PCT Pub. No.: WO2019/224737
PCT Pub. Date: Nov. 28, 2019

(65) Prior Publication Data
US 2021/0186761 A1    Jun. 24, 2021

(30) Foreign Application Priority Data
May 23, 2018 (ZA) ............................. 2018/03406

(51) Int. Cl.
*A61F 11/08*    (2006.01)
*B29D 99/00*    (2010.01)

(52) U.S. Cl.
CPC .............. *A61F 11/08* (2013.01); *B29D 99/00* (2013.01)

(58) Field of Classification Search
CPC ........ A61F 11/08; A61F 11/085; A61F 11/10; A61F 11/12; A61F 11/06; A61F 11/00;
(Continued)

(56) References Cited

U.S. PATENT DOCUMENTS 3,871,372 A    3/1975    Bivins
4,314,553 A    2/1982    Westerdal
(Continued)

FOREIGN PATENT DOCUMENTS

CN    1812633 A    8/2006
CN    209847571 U    12/2019
(Continued)

OTHER PUBLICATIONS

Chinese Office Action for Application No. 201980034706.0, dated Sep. 27, 2022.
(Continued)

*Primary Examiner* — Alireza Nia
*Assistant Examiner* — Robin Han
(74) *Attorney, Agent, or Firm* — MARSHALL, GERSTEIN & BORUN LLP

(57) ABSTRACT

The invention provides a moulded earplug set (300) which includes two earplugs (302, 304) each having a stem (332, 334) with a cord or lanyard (306) extending between the stems to connect the earplugs together. The cord may be integrally moulded with the earplugs and extend laterally from the stem of each. The sides of the cord may adjoin to form a generally planar cord body (72) and may be defined by sulcations in the cord body. The set may include an integrally moulded storage container (308) for the earplugs, comprising two cap formations (314, 316) separated by a hinge (322). An integrally moulded strap (310) may be provided to permit the cap formations to be locked in a closed condition abutting each other. The set may include frangible bridge formations (342) connecting the earplugs to the cord body. Each earplug may include a grip defining a plurality of indentations.

4 Claims, 14 Drawing Sheets

(58) Field of Classification Search
CPC ........ A61F 2/18; A61F 2002/183; A61F 5/56;
H04R 1/10; H04R 1/1016; H04R 1/1083;
H04R 1/1033; H04R 1/1058; H04R
1/1066; H04R 1/105; H04R 1/1008;
H01B 7/40; H01B 7/06; H01B 7/065;
H01B 7/08; H01B 7/04; B29C 39/26;
B29C 43/00; B29C 39/00; B29C 39/10;
H02G 11/02; B65D 85/04; B65D 85/00;
B65D 85/02; B65H 75/364; B65H 75/00;
B65H 75/34; B65H 75/36; B65H 75/362;
B65H 55/00–046; B29D 99/00
See application file for complete search history.

(56) References Cited

U.S. PATENT DOCUMENTS

| | | | |
|---|---|---|---|
| 4,936,411 A | | 6/1990 | Leonard |
| 6,440,339 B1* | | 8/2002 | Magidson ............... B29C 39/10 264/157 |
| 7,967,015 B2* | | 6/2011 | Jenkins, Jr. ............. A61F 11/08 128/857 |
| 7,998,391 B1* | | 8/2011 | Koo ........................ B29C 39/10 264/294 |
| 9,073,727 B2* | | 7/2015 | Solomon ................. B65B 63/06 |
| 2006/0162992 A1 | | 7/2006 | Seville |
| 2006/0213525 A1* | | 9/2006 | Matsumoto ............. A61F 11/12 128/867 |
| 2008/0011308 A1 | | 1/2008 | Fleming |
| 2008/0142531 A1 | | 6/2008 | Jensen |
| 2009/0194630 A1* | | 8/2009 | Thiyagarajan ....... H04R 1/1033 242/405.1 |
| 2010/0300460 A1* | | 12/2010 | Falco ..................... A61F 11/08 156/256 |
| 2012/0090626 A1 | | 4/2012 | Chen |
| 2014/0190494 A1 | | 7/2014 | Ely |
| 2014/0246029 A1 | | 9/2014 | Magidson et al. |
| 2014/0334658 A1* | | 11/2014 | Wang ................. B29C 45/14549 381/381 |
| 2015/0163580 A1* | | 6/2015 | Wallaja ................ H04R 1/1033 381/384 |
| 2017/0195760 A1* | | 7/2017 | Tang ....................... A45C 11/00 |
| 2019/0269469 A1* | | 9/2019 | Bush, Jr. ................ A61B 34/74 |

FOREIGN PATENT DOCUMENTS

| | | | |
|---|---|---|---|
| GB | 1502353 A | | 3/1978 |
| JP | S53-088321 U | | 7/1978 |
| JP | 2006-204632 A | | 8/2006 |
| JP | 2017-522920 A | | 8/2017 |
| KR | 10-2006-0087429 A | | 8/2006 |
| KR | 10-2015-0103258 A | | 9/2015 |
| WO | WO-2015/179128 A1 | | 11/2015 |
| WO | WO-2017173210 A1 * | 10/2017 | ............. B65D 85/04 |

OTHER PUBLICATIONS

International Search Report and Written Opinion for International Application No. PCT/IB2019/054224, mailed Dec. 4, 2019.
Office Action with Translation for Japanese Patent Application No. 2021-515303, dated May 9, 2023.
South Africa Second Office Action for Application No. ZA2020/07409, dated Oct. 18, 2023.
United Kingdom Examination Report for Appliation No. GB2018462.8, dated Mar. 18, 2022.
Office Action with English Translation for Russian Application No. 2020137793/14(069844), filed Oct. 24, 2022.
Search Report for Russian Application No. 2020137793/14(069844), dated Oct. 24, 2022.
Third UK Examination Report for Application No. GB2018462.8, dated Jul. 7, 2022.
First Korean Office Action with Translation for Application No. 10-2020-7034348, dated Mar. 20, 2024.
First Canadian Office Action for Application No. 3,101,075, dated Jun. 6, 2024.

* cited by examiner

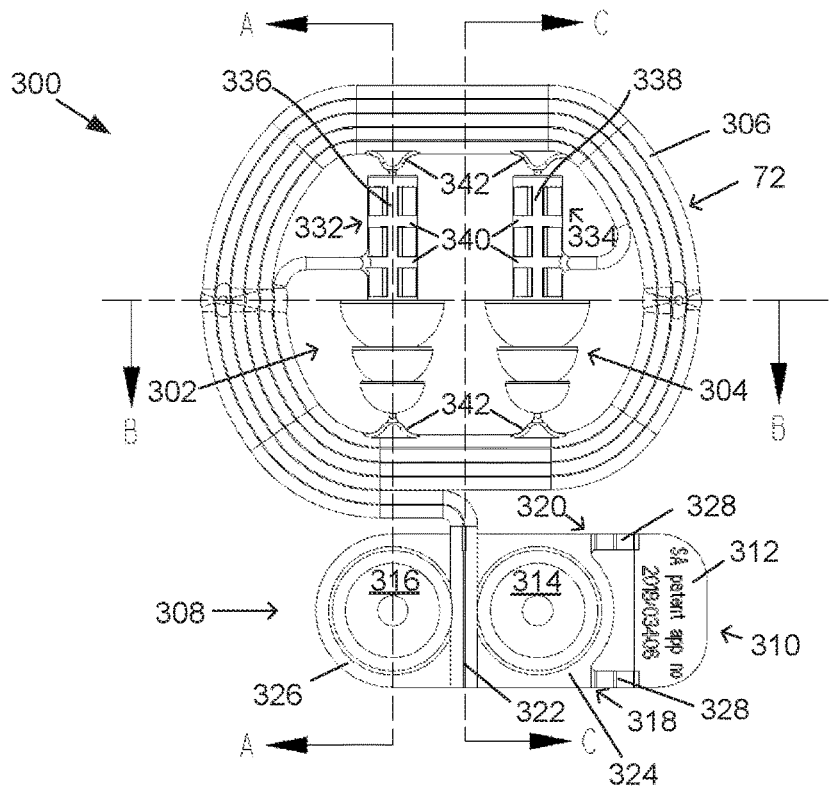
Figure 25
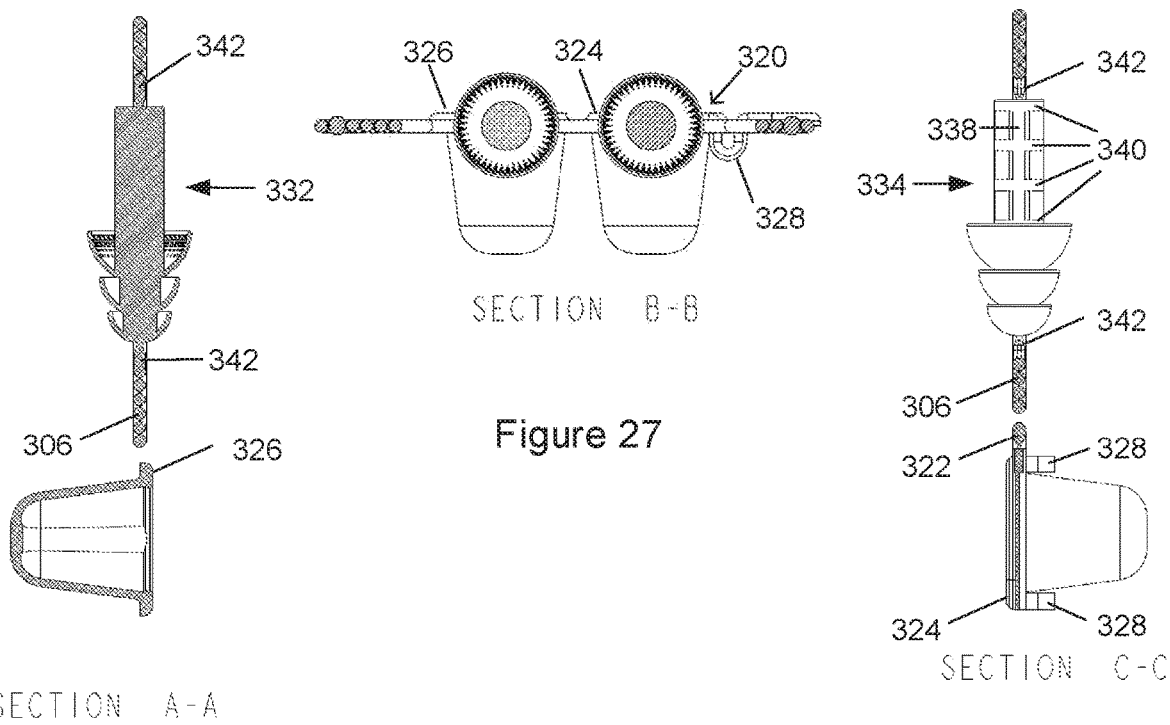
Figure 26
Figure 27
Figure 28

EARPLUGS WITH CORD

CROSS-REFERENCES TO RELATED APPLICATIONS

This present application is the US national phase of International phase patent application No. PCT/IB2019/054224, filed May 22, 2019, which claims priority to South African provisional patent application number 2018/03406 filed on 23 May 2018, which is hereby incorporated by reference in its entirety.

FIELD OF THE INVENTION

This invention relates to earplugs for protecting a user's ears from loud noises.

BACKGROUND TO THE INVENTION

Earplugs are devices meant to be inserted into a user's ear canals in order to protect the user's ears from loud noises, water intrusion, foreign bodies, dust, excessive wind or the like. Several types of earplugs exist, each with its own features, advantages and disadvantages.

Earplugs are described in the following United States utility patent and design patent applications: U.S. Pat. Nos. 4,314,553; 4,867,149; 4,936,411; 5,113,967; 5,668,354; 5,727,566; 6,241,041; 7,314,047; 7,537,011; 7,967,015; 8,118,031; 8,291,911; 8,897,458; 9,155,661; 10034798; US2006/0162992A1; US2006/0213525A1; US2008/011308A1; D298356; D492765S; D560792S; and D802555S.

The present invention relates generally to earplugs of the type that protect a user's ears against loud noises. The present invention further relates to earplugs which include at least one flange configured to engage a user's ear canal in order to substantially cover the ear canal and retain the earplugs in place therein. Such earplugs may include a body defining a shaft with which the earplug may be manoeuvred and placed into position in the user's ear, or with which it may be removed therefrom. In the remainder of the specification, such earplugs will be referred to as "flanged hearing protection earplugs".

Flanged hearing protection earplugs are often used in manufacturing facilities such as factories, and are typically provided in pairs connected by a cord secured to the respective bodies of the earplugs. The cord may assist in keeping a set of earplugs together, preventing loss of one or both of them. It also allows earplugs removed from a user's ears to hang around the user's neck when they are not needed.

Earplugs are typically manufactured by injection molding, particularly when the earplugs are made of a plastics or silicone material. A limitation of molding is that a cycle time between parts is largely dependent on the time that the molded material takes to cure, freeze or solidify (as appropriate), which in turn is dependent on the thickest section of the molded part. A shaft of flanged hearing protection earplugs is typically about 5 mm in diameter and it also typically defines a socket. During molding, a steel pin forms the socket. The steel pin cannot convey heat from the part fast enough due to a relatively small diameter of about 1.5 mm, which then equals the size of the socket. As such, plastic injected into the mold at about 220° C. takes a significant time to cool down and solidify, whereafter the part may be removed from the mould. The socket in the shaft is required for the cord to be inserted therein and as a result the size thereof cannot be increased without additional difficulties arising. Some earplugs include an additional part between the cord and the shaft, which allows a larger diameter steel pin to be used in the molding process, thereby allowing a quicker cooling time. However, it will be apparent that the additional part may lead to additional manufacturing requirements, part and assembly costs. This is undesirable.

One notable drawback of the cords used in corded flanged hearing protection earplugs is that, as mentioned above, the cord is inserted after molding, which requires additional manufacturing steps, time and tools, or manual labourers if it is inserted manually. The socket in the shaft of earplugs that accepts the cord increases cycle time as explained above, while coiling the cord after manufacturing further increases manufacturing difficulty and costs. The additional plastics material used for the cord may also lead to recyclability concerns due to a different material usage compared to the earplugs themselves. If the corded flanged hearing protection earplugs include a cord retaining stub, a cord tie down and a storage bag, this problem may be more significant.

Known cords for earplugs are typically manufactured via braiding or extrusion. Braiding produces solid, uniformly sectioned stranded cords which are relatively good conductors of sound waves. Extrusion produces a single, solid, uniformly sectioned cord which is a relatively good conductor of sound waves. Even rubbing of such cords against, for example, the clothing of a user may lead to sound waves travelling to a user's ear along the cord itself.

An additional concern with known earplugs is the storage thereof between uses. Earplugs may be supplied in separate bags, as noted above, but these bags may easily be lost. Corded earplugs may simply be placed in a user's pocket for at least some form of protection, but this often leads to entanglement of the cord. Leaving corded earplugs hanging around a user's neck offers almost no protection thereto. In both the two scenarios, dust or a similar material may settle on the flange surfaces, particularly if earwax is attached thereto. This may lead to introduction of unwanted material into a user's ear canal during a subsequent use, which can lead to irritations or infections.

In existing earplugs the flanges may also not provide optimal damping of sound thus requiring more flanges to be provided than otherwise required, or more material to be used to manufacture the flanges than would be otherwise required.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

SUMMARY OF THE INVENTION

In accordance with a first aspect of the invention there is provided a molded earplug set, the set including two earplugs each having a stem providing a grip at one end and a nose at the opposite end with at least one sound dampening member provided towards the nose end, with a cord or lanyard extending between the earplugs to connect them together, and characterised in that the cord is integrally molded with each earplug.

The cord may extend between and be integrally molded with the stems of the earplugs.

The set may include at least one storage container for the earplugs, said storage container being integrally molded with the earplugs.

The grip of each of the two earplugs may define a plurality of indentations or dimples on its outer surface and the indentations may be arranged along the length of the grip so that a distance from any point in the stem to the outer surface of the grip is less than the radius of the stem.

The grip of each of the two earplugs may include at least one elongate ridge extending longitudinally along a portion of the length of the grip, and at least three mutually spaced wall formations projecting generally transversely from said elongate ridge, the ridge and the wall formations delimiting a plurality of indentations or dimples provided along the length of and around the outer surface of the grip.

The stem of each of the two earplugs may define a central longitudinal axis and at least a portion of the cord may extend laterally from the side of the earplug in a direction transverse to the central longitudinal axis of the stem.

The cord may extend laterally from the side of the stem. Instead, the cord may extend from the end of each stem.

The cord may be provided in a folded or wound configuration. The sides of the cord may adjoin to form a cord body. The sides of the cord may be defined by sulcations or lines of weakness in the cord body which permit tearing of the cord body therealong to form the cord. The sulcations or lines of weakness may be molded into the cord body. The sulcations or lines of weakness may be pressed into the cord body. The sulcations or lines of weakness may be cut into the cord body. The cord body may have a generally planar or cylindrical shape.

The set may include at least one frangible bridge formation connecting at least one of the earplugs to the cord body. In preferred embodiments, the set may include a plurality of frangible bridge formations connecting both earplugs to the cord body. For example, the set may include four bridge formations, two for each earplug. Each bridge formation may extend between one of the two earplugs and an innermost coil of the cord body, and may extend either from the nose or from the grip of the stem of the earplug to which it is connected.

The bridge formations may be expected to stabilise the earplugs in relation to the cord body prior to first use of the earplug set. To permit first use, the bridge formations may be broken by a user such that each of the two earplugs is disconnected from the side of the innermost coil of the cord body, the earplugs nevertheless remaining connected to each other via the cord.

The sound dampening member may be a flange.

According to a further aspect of the invention there is provided an earplug apparatus which includes at least one earplug comprising a stem providing a grip at one end and a nose at the opposite end with at least one sound dampening member provided towards the nose end, with a cord extending from the earplug, and characterised in that the cord is integrally molded with the earplug.

The cord may be integrally molded with the stem of the earplug.

According to a further aspect of the invention there is provided an earplug apparatus which includes at least one earplug comprising a stem providing a grip at one end and a nose at the opposite end with at least one sound dampening member provided towards the nose end, and characterised in that at least one storage container for the earplug is integrally molded with the earplug.

In respect of both the earplug set and the earplug apparatus, the storage container may define a cavity for receiving at least the nose end and the sound dampening member of at least one of the earplugs. The container may define two cavities. At least one of the earplugs may include a locating member, and at least one of the cavities may define a locating member receiving formation configured to receive and hold the locating member captive. The container may include a lid for at least partially closing the nose and sound dampening member of at least one of the earplugs inside the cavity or cavities. The lid may include a locking formation for locking the lid in a closed condition.

The container may extend from the grip or from a cord extending from the grip of at least one of the earplugs. A pair of earplugs may be molded with an integral cord and a container for each earplug may be molded integral with the cord. Thus, the storage container may be integrally molded with the stem of the, or each, earplug via the cord, such that the container, cord and stem or stems are integrally molded with one another.

The container may be collapsible onto itself. The container may be collapsible in a concertina-like or telescoping fashion.

In respect of the earplug set and those embodiments of the earplug apparatus which include a pair earplugs, the storage container may comprise:

first and second cap formations each defining a cavity for receiving at least a portion of one of the earplugs;

hinge means provided between said first and second cap formations to permit hinging of the cap formations relatively to each other and into a closed condition in which the cap formations abut one another and the cavities which they define face each other; and locking means for reversibly locking the cap formations in said closed condition.

The hinge means may, for example, comprise a resiliently deformable portion of the storage container positioned between the first and second cap formations.

The locking means may comprise a strap formation and a complementary strap formation engaging formation integrally molded with the cap formations. The strap formation engaging formation may be provided by at least a portion of one of the cap formations.

The strap formation may include a substantially planar web portion and at least one resiliently deformable kink formation projecting outwardly from said planar web portion. In use, deformation of the kink formation or formations by the user may permit the area of a footprint of the strap formation to be expanded temporarily and resiliently from a first, default footprint area to a second expanded footprint area, thereby to facilitate engagement of the strap formation with the strap formation engaging formation. The kink formation or formations may thus promote elasticity and additional lengthening of the strap formation during stretching thereof. The kink formation may also permit the strap tension to be lessened when it is engaged with the complementary strap formation engaging formation.

According to a further aspect of the invention there is provided an earplug apparatus which includes at least one earplug, the earplug comprising a stem which defines a central longitudinal axis and provides a grip at one end and a nose at the opposite end with at least one sound dampening member provided towards the nose end, and a cord or lanyard extending from the earplug, characterised in that at least a portion of the cord extends laterally from the earplug in a direction transverse to the central longitudinal axis of the stem.

The cord may extend laterally from the side of the stem.

The cord extending laterally from the stem may be connected to the side of the stem at a distance from the nose end of the stem which is no greater than 25 mm, and typically about 19 mm therefrom. During use of the earplug apparatus, this configuration may permit at least a portion of the cord to rest against the earlobe and/or cheek of a user of the apparatus, thereby to dampen sound waves and other vibrations which might otherwise be transmitted to the user's ear via the cord.

According to a further aspect of the invention there is provided an earplug apparatus which includes at least one earplug comprising a stem which provides a grip at one end and a nose at the opposite end with at least one sound dampening member provided towards the nose end, and characterised in that the grip includes at least one elongate ridge extending longitudinally along a portion of the length of the grip, and at least three mutually spaced wall formations projecting generally transversely from said elongate ridge, the ridge and the wall formations delimiting a plurality of indentations or dimples provided along the length of and around the grip.

According to a further aspect of the invention there is provided an earplug apparatus which includes at least one earplug comprising a stem which provides a grip at one end and a nose at the opposite end with at least one sound dampening member provided towards the nose end, and characterised in that the grip defines a plurality of indentations or dimples on its outer surface and the indentations are arranged along the length of the grip so that a distance from any point in the stem to the outer surface of the grip is less than the radius of the stem.

The grip of the earplug may include at least one elongate ridge extending longitudinally along the length of the grip, and at least three mutually spaced wall formations projecting generally transversely from the ridges, the ridge and the wall formations delimiting a plurality of indentations or dimples provided along the length of and around the grip.

In preferred embodiments, the grip includes four ridges and five wall formations provided along the length of the grip, which together delimit sixteen indentations.

The indentations may be provided by at least one feature selected from the group consisting of channels, grooves, dimples and the like. A protuberance may be provided towards the end of the grip to facilitate purchase by a user during grasping of the grip.

More than one sound dampening member may be provided towards the nose end of the stem. The sound dampening members may each comprise a flange. The flanges may be spaced at intervals along the stem and may incrementally increase in size, with the smallest flange being provided at or near the nose.

A socket may extend from the grip end of the stem into the stem. The socket may be configured to receive a complementary cord in a friction fit. The diameter of the socket may be from about 0.1 mm to about 2.0 mm inclusive; the diameter may be about 1.5 mm.

Two earplugs to be provided as part of a set. The two earplugs in the set to be attached to each other by a cord.

The flanges may be domed. The free ends of the domes may be directed towards the grip.

According to a further aspect of the invention there is provided an earplug apparatus which includes at least one earplug comprising a stem providing a grip at one end and a nose at the opposite end with at least one sound dampening member provided towards the nose end and wherein the surface of at least one sound dampening member includes sound scattering formations thereon.

The sound scattering formations may be provided only on a sound dampening member nearest the grip.

The sound scattering formations may be in the form of features selected from the group consisting of ribs, tetrahedral shapes, irregular shapes, surface texturing, and the like.

More than one sound dampening member may be provided towards the nose end of the stem. Sound scattering formations may be provided on one or more of the sound dampening members; the sound scattering formations may be provided only on an outermost of the members. The, or each, sound dampening member may comprise a flange. The flanges may be spaced at intervals along the body and may incrementally increase in size, with the smallest flange being provided at or near the nose.

The flanges may be domed. The free ends of the domes may be directed towards the grip.

According to a further aspect of the invention there is provided a cord or lanyard for a set of earplugs, characterised in that sound reflecting formations are provided on the surface thereof.

The formations may protrude into or out from an outer surface of the cord. The height of the protrusion may be from about 0.1 mm to about 0.4 mm inclusive; the height may be about 0.2 mm. The formations may be spaced from about 0.5 mm to about 4 mm (inclusive) apart along a length of the cord; they may be spaced about 2 mm apart. The formations may be ramped, with a higher side of the ramp located towards an end of the cord and a lower side of the ramp located towards a centre of the cord.

The formations may each have a shape selected from the group consisting of triangular, conical, trapezoidal, conical with non-straight edges, triangular with curved edges, and connected truncated cone shapes. The formations may be arranged such that an apex of one formation faces the base of an adjacent formation.

According to a further aspect of the invention there is provided a process for molding an earplug apparatus which includes at least a step of providing a mold and a step of curing a plastics material in said mould, characterised in that said mold defines a cavity for molding an earplug and a cavity for molding a cord, and said cavities are in communication with each other thereby to permit integral molding of the earplug and cord.

The earplugs, cords and storage containers or cases described above may be manufactured from plastics material such as a thermoplastic elastomer, or silicone rubber material.

The plastics material may advantageously comprise a short chain polymer which requires lower molding pressures of the order of 700 bar as compared with pressures of the order of 1200 bar that are required for long chain polymers as used in some other types of earplugs.

Fillers or other suitable additives may be blended with the plastics material to attenuate acoustic conduction through components of the earplug sets, for example conduction along the cords. This may be of benefit in reducing undesirable noise which might otherwise be transmitted to a user's ears via the cords, for example noise caused by movement of the cords over the user's body during use.

For a better understanding of the present invention and to show how the same may be carried into effect, embodiments of the invention will now be described by way of non-limiting example only, with reference to the accompanying diagrammatic drawings.

BRIEF DESCRIPTION OF THE DRAWINGS

In the drawings:

FIG. 25 illustrates, schematically, a plan of an embodiment of an earplug set according to a further aspect of the invention, the set providing, amongst other features, a storage container comprising a resiliently deformable strap formation to facilitate closing of the container, and lateral mounting of a cord on the stem of each earplug;

FIG. 26 illustrates, schematically, a cross-sectional view of the earplug set of FIG. 25, taken along the line A-A in FIG. 25;

FIG. 27 illustrates, schematically, a cross-sectional view of the earplug set of FIG. 25, taken along the line B-B in FIG. 25;

FIG. 28 illustrates, schematically, a cross-sectional view of the earplug set of FIG. 25, taken along the line C-C in FIG. 25;

DETAILED DESCRIPTION WITH REFERENCE TO THE DRAWINGS

The present invention provides earplugs, earplug sets and related components that may lead to improvements in multiple aspects of earplug use, manufacture, and disposal.

Figure 1:
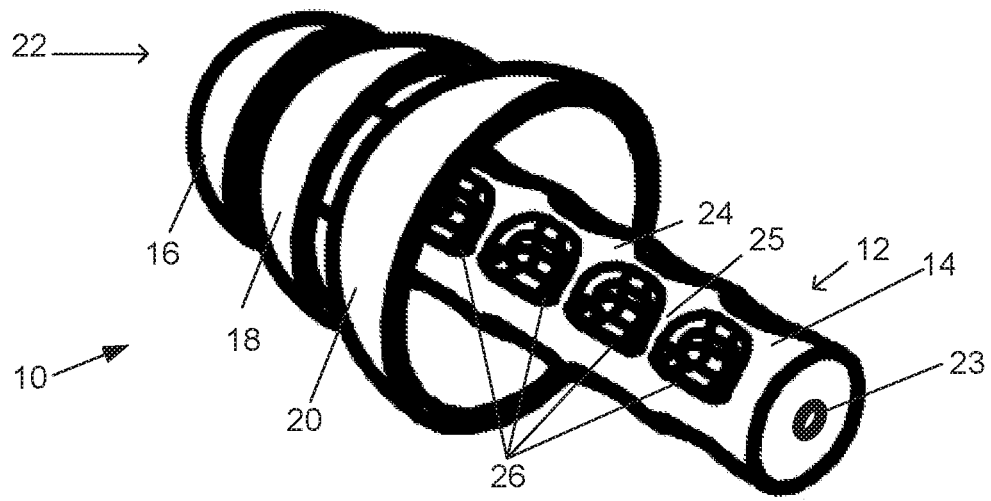
FIG. 1 illustrates, schematically, a three-dimensional view of an embodiment of an earplug apparatus according to an aspect of the invention which provides, amongst other features, a plurality of indentations or dimples disposed along a grip forming part of an earplug.

FIG. 1 shows an earplug (10) according to an embodiment of a first aspect of the invention. The earplug includes a body (12) defining an elongate stem (14). The stem (14) provides a grip at one end of the earplug (10). Sound dampening formation in the form of three generally hemispherically-shaped domed flanges (16, 18, 20) are provided at an opposite nose end (22) of the stem (14). Each domed flange (16, 18, 20) forms a resiliently deformable skirt of relatively uniform thickness. Free ends of the flanges (16, 18, 20) face away from the nose end (22) and are directed at the grip. The flanges (16, 18, 20) are spaced at intervals along the length of the stem (14) and incrementally increase in size along the length of the stem (14), with a smallest flange (16) being located at the tip of the nose end (22) and a largest flange (20) being located the furthest therefrom and being the outermost flange. Earplugs with such domed flanges may be referred to as "domed flange type" earplugs.

The stem (14) is at least partially hollow and has an outer diameter of about 5 mm. The hollow is provided by a socket (23) extending from a grip end of the earplug into the stem (14), where it forms an access port. The socket (23) terminates in a blind end in the stem (14), and is configured to receive a complementary cord or lanyard through the access port. The stem is configured to hold a cord inserted into the socket captive in a friction fit. The diameter of the socket is about 1.5 mm to allow this.

The earplug of the present embodiment is made of a plastics material in the form of a thermoplastic elastomer. During manufacture of the earplug (10) via molding, a pin of equal diameter of the socket located within the mold allows the socket to form in the shaft. This pin may be expected to be made of stainless steel. Before the earplug may be removed from the mould, the plastics material must sufficiently solidify to allow removal and molding of a next part. Molding may be expected to be at a temperature of about 220° C. The pin generally does not convey heat fast enough from the plastics material, and as a result heat has to be conveyed from around the socket through the stem (14) to allow the innermost material around the socket to cool to a sufficiently low temperature to solidify. The rate of heat transfer through the stem (14) is directly related to the thickness of the material.

The grip of each earplug includes four elongate ridges extending longitudinally along the length of the grip, which in combination have a generally cross-shaped cross-section. Reference numeral 24 in the drawing indicates one of the four ridges. The ridges are punctuated by a series of wall formations (25) which project generally transversely from and connect the ridges at intervals.

The ridges and wall formations delimit a plurality of indentations or dimples (26) provided along the length of and around the grip of the stem (14).

The indentations (26) are arranged along the length of the grip so that a distance from any point in the stem (14) to the outer surface of the grip is less than the radius of the stem. It should be noted that the distance is not radially outward and perpendicular to a central axis of the shaft of the stem only, but directly towards the closest point, which may be toward the closest indentation or the like. As a result, the closest distance of material through which heat must travel to dissipate is reduced. The indentations (26) along the length of the stem (14) reduce the thickness of the material though which heat must travel, thereby increasing the rate of heat transfer from the stem. The innermost material along the socket, and therefore the entire earplug, may thus be expected to solidify in less time. As a result, the earplugs need to spend less time in the mould, and part rotation speed may be increased. This makes production more efficient, with potentially a higher production time and reduced cycle time per part.

It will be apparent that the indentations must be sufficiently sized to still allow the mechanical forces that the earplugs may be expected to experience during normal use, in particular forces due to handling of the earplug during insertion and removal from a user's ear, and also the forces that may be experienced when a cord is secured in the socket. The applicant expects that the injection molding time may be reduced by up to 30% by the introduction of sufficiently-sized indentations.

The indentations may also be provided in any suitable size, shape or form including, but not limited to, channels, grooves and dimples. Many differently profiled indentations may be provided, including differently profiled indentations on a single earplug.

It will be appreciated that while flanges are shown to be the sound dampening formations, any suitable form of sound dampening formation may be used. While three domed flanges are shown in the embodiment of FIG. 1, any suitable number may be provided, including one, two, or more than three as desired.

In use, and as is known in the art, a user may be expected to hold the earplug (10) via the stem (14), and insert the nose end including the domed flanges (16, 18, 20) into one of their ear canals. At least some of the flanges may each readily deform under its own resilience as the flanges engage the side walls of the user's ear canal, where the resilient nature of the flanges may serve to retain the earplug in position in the ear canal. The earplug is typically inserted deep enough into the ear canal so that the largest flange (20) located nearest the grip and being the outermost flange at least partially blocks the ear canal. In this location in use, the earplug may serve to at least partially block sound waves from reaching the inner ear of the user, thereby protecting the ear against damage from exposure to high levels of sound. A user may be expected to insert one earplug into each of their ear canals. Removal of an earplug from an ear canal may be achieved by holding onto and pulling on the stem (14), which may be expected to protrude through the earhole of a user during use.

Earplugs of the present embodiment may typically be provided or sold in a set of two, and a connection cord may be provided as part of the set, with the ends of the cord held by the sockets of the earplugs in a friction fit as described above.

A set of earplugs of the type described above with reference to FIG. 1 may also be provided connected to a cord. The cord may be inserted into the sockets in the grip ends of the earplugs. It will be apparent that many different types of cords may be suitable for use. The shape and configuration of the socket may be chosen to match that of a specific type of cord. The diameter of the cord may vary, and a range of from about 1 mm to about 1.8 mm inclusive, as appropriate for a socket size, is envisaged. Similarly, a cross-sectional profile other than round may also be employed.

It should be noted that where the provision of corded earplugs is not a requirement, the embodiment shown in FIG. 1 may be provided without the socket (24) in the grip. Then, the indentations may still provide a reduced cooling time to speed up cycle time, and may also lead to less material usage during manufacture.

Figure 2:
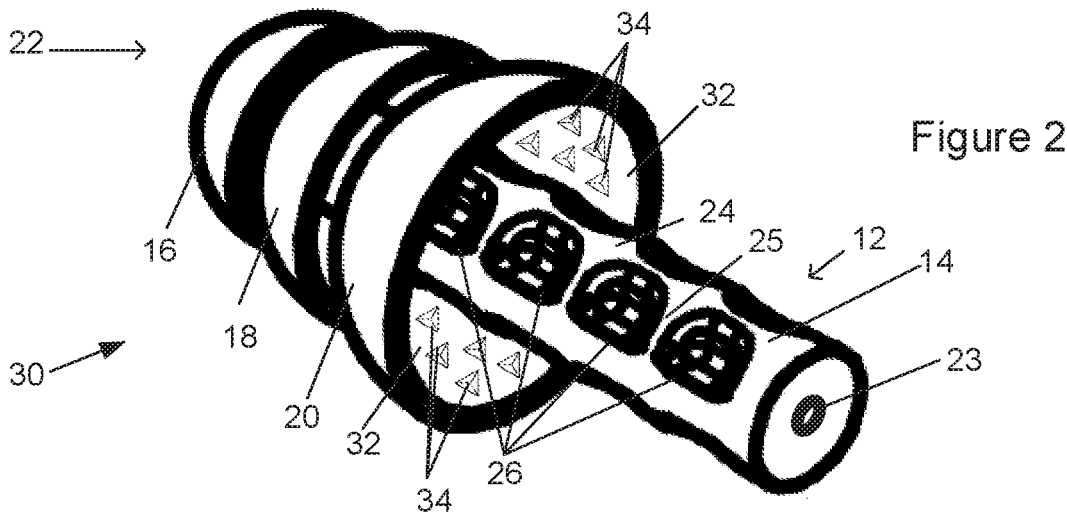
FIG. 2 illustrates, schematically, a three-dimensional view of an embodiment of an earplug apparatus according to a further aspect of the invention which provides, amongst other features, sound scattering formations on the inside of a domed flange of an earplug.

FIG. 2 shows an earplug (30) according to a first embodiment of a further aspect of the invention. The earplug is notably similar to the one of FIG. 1, and like reference numerals are used to indicate like components and features.

Sound scattering formations (also referred to herein as sound diffusing formations) are provided on a convex surface forming a face (32) of the largest flange (20), located nearest the grip (14) and being the outermost flange. In the present embodiment the sound diffusing formations are tetrahedron-shaped protrusions (34) extending from the face (32). The sound diffusing formations serve to scatter and reflect sound waves from the face (32) of the flange, causing the sound waves to be reflected away from the face (32). This may reduce the transmission of sound through the flange, resulting in less sound reaching the inner ear of the user and increasing the dampening effect of the earplug. It may also serve to deflect sound waves away from the stem (14), whereas a smooth face may simply reflect the sound waves towards the stem (14) where it may further be transmitted toward the nose end (22) and the inner ear of a user.

Figure 3:
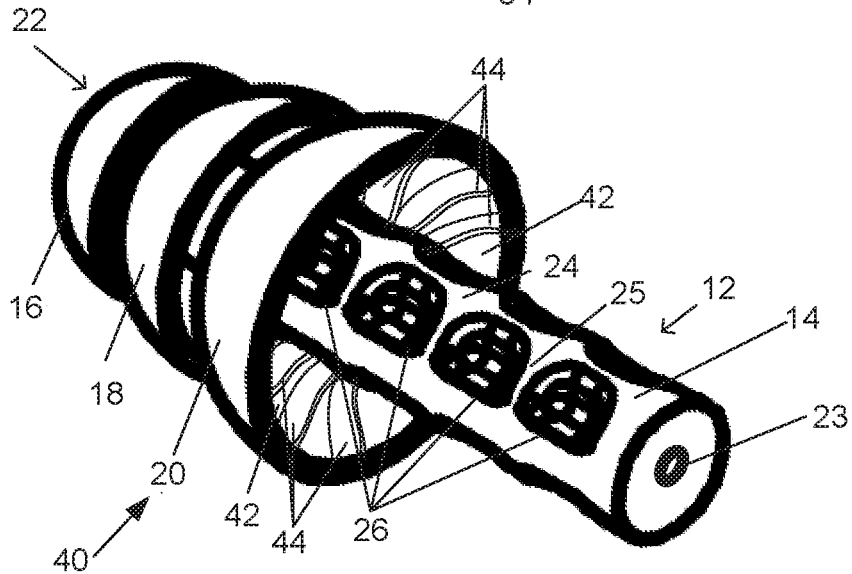
FIG. 3 illustrates, schematically, a three-dimensional view of a further embodiment of an earplug apparatus which provides, amongst other features, a further type of sound scattering formations.

FIG. 3 shows a further embodiment of an earplug (40) according to the present aspect of the invention. This earplug is also similar to the earplug of FIG. 1, and like reference numerals are used to indicate like components and features. In this embodiment, sound scattering formations are provided in the form of ribs (44) on the concave surface forming an internal face (42) of the largest flange (20). The ribs similarly serve to reflect sound waves from the face of the dome, thereby leading to reduced transfer of sound though the earplugs and an increased dampening factor.

The ribs are shown to extend radially from the shaft, however, it should be noted that they may also be provided concentrically spaced along a flange, increasing in diameter with that of the flange. This may assist with noise dispersion as sound waves may be deflected away from the flange.

In some circumstances a reduced dampening factor may not be desired as excessive dampening may lead to a user not hearing certain sounds which they should. Then, by employing the above aspect less material, and possibly even less flanges, may be required to effect a suitable dampening. This may lead to lower material usage during manufacturing and an equivalent lower cost of the earplug.

It will be appreciated that sound diffusing formations may be provided on not only the outermost flange, but may be provided on any one or more of the flanges. If only one flange is provided the sound diffusing formations can only be provided thereon. It should be noted that sound diffusing formations may take any suitable form or shape. Multiple shapes and formats of sound diffusing formations, particularly ribs, tetrahedron shapes, irregular shapes, surface texturing or the like may be provided. Several of such shapes may be provided on a single surface of a flange.

Figure 4:
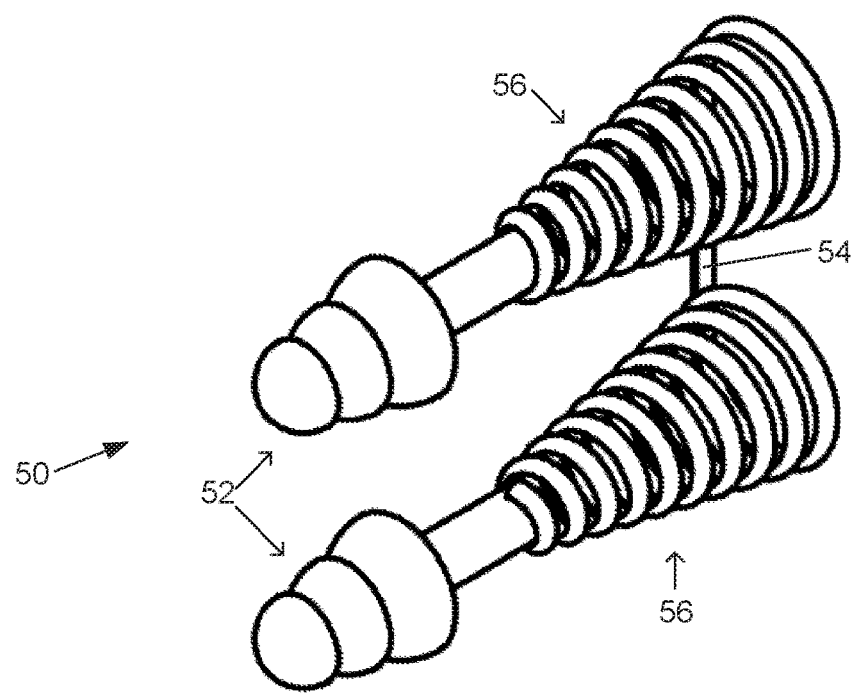
FIG. 4 illustrates, schematically, a three-dimensional view of an embodiment of an earplug set according to a further aspect of the invention which provides, amongst other features, a cord which is integrally molded with two earplugs and connects them to each other.

FIG. 4 shows an earplug set (50) according to an embodiment of a further aspect of the invention. The set includes two earplugs (52) and a cord or lanyard (54) connecting the two earplugs (52).

The earplugs (52) are of the type that includes a body defining an elongate stem providing a grip at one end and a nose at an opposite end, with a set of three domed flanges provided towards the nose end, with free ends of the flanges facing away from the nose end. The flanges are spaced at intervals along the length of the stem and incrementally increase in size, with a smallest of the flanges located at the tip of the nose end and a largest of the flanges located the furthest away therefrom and being the outermost flange.

The cord (54) includes two coiled, spirally wound sections (56) and is attached partially around the outer surface of the stems of the earplugs (52). As the cord is integrally molded with the stems, the cord connects the stems together. Molding of the cord in this coiled fashion partially around the outer surface of the stem may provide a stronger connection between the cord and the stem than a direct connection at an end of the stem providing the grip.

The present earplug set is molded as a unit. The cord is therefore integrally molded with the two earplugs, allowing a single mold to produce the complete set. All parts in the set are manufactured from the same material, which simplifies recycling (disposal) of the set. Production time is reduced as the cord does not need to be separately inserted into the earplugs. Manufacturing is simplified as different types of parts need not be stored. As the cord need not be inserted into a socket in the earplug stems, the drawback associated with a molding pin, as explained above, is eliminated and the part may cool down and solidify quicker. This further improves manufacturing time.

The coiled, spirally wound sections (56) of the cord may have a form of elasticity, whereby the coils may be stretched out to allow a user to place the earplugs in their ears, but wherein the cord returns to its shape with the two coiled sections (56) when tension in the cord is released. This may be when the user takes the earplugs out of their ears. This may reduce the tendency of cords to become entangled when placed in a user's pocket or when another similar storing means is used.

It should be noted that this aspect of the present invention extends to other types of earplugs, and not only the specific type shown in FIG. 4. Other types of earplug, for example foam earplugs or the like, may also employ this aspect of the invention to simplify manufacturing, recycling (disposal), and use.

Figure 5:
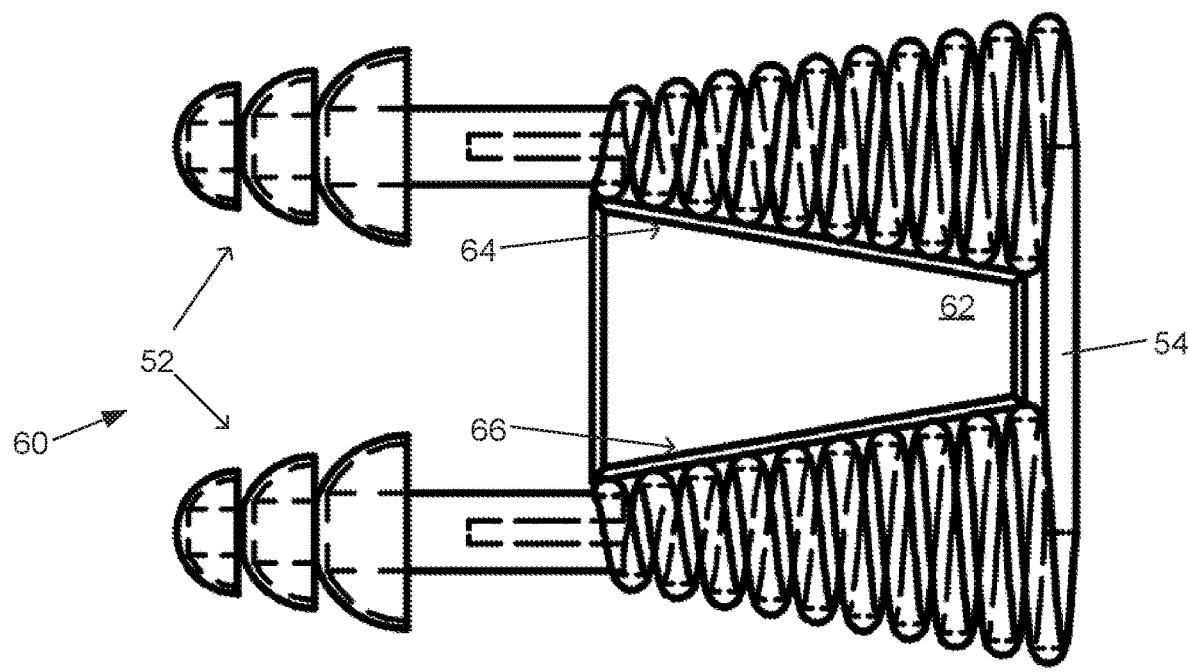
FIG. 5 illustrates, schematically, a three-dimensional view of a further embodiment of an earplug set with an integrally molded cord.

FIG. 5 shows an earplug set (60) similar to that of FIG. 4, and like reference numerals are again used for like features and components. In this embodiment, however, a planar member (62) is attached to the coiled sections (56), with the coils in the coiled sections being attached to adjacent sides (64, 66) of the planar member (62). The planar member may simplify the molding process, and may improve storage of the earplug set before first use. The planar member eliminates the need for a cord tying member to keep the cord from becoming entangled either on its own, or with other cords of other earplug sets.

The coils may be torn and released from the planar member before first use, and the planar member may then be discarded in an appropriate manner.

Figure 6:
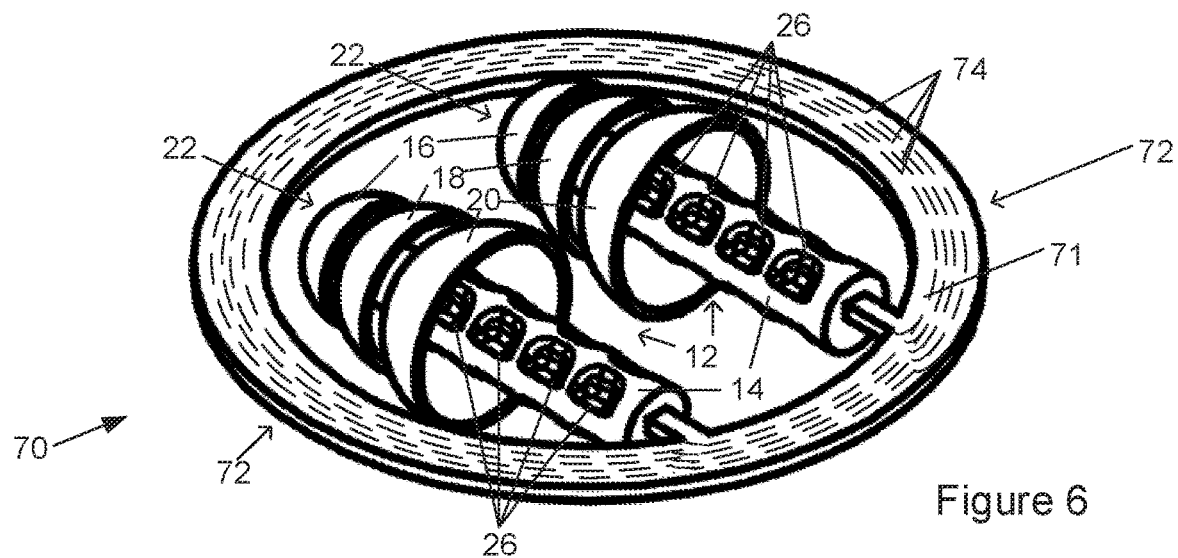
FIG. 6 illustrates, schematically, a three-dimensional view of a further embodiment of an earplug set with an integrally molded cord.
Figure 7:
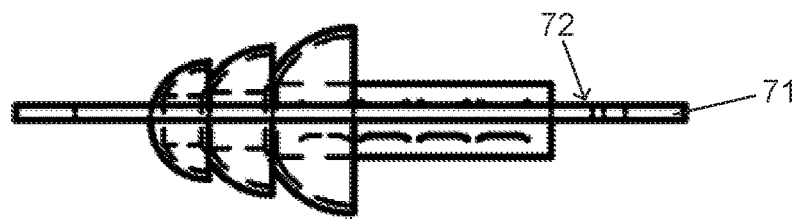
FIG. 7 illustrates, schematically, a side view of the earplug set of FIG. 6.

FIGS. 6 and 7 show an earplug set (70) according to an additional embodiment of the present aspect of the invention. The set includes two earplugs (10) of the type described above with reference to FIG. 1, and like features and components are indicated by like numerals. In this embodiment, however, the stem (14) does not define a socket, as a cord or lanyard (71) connecting the two earplugs is integrally molded with the earplugs at the stem and is attached at ends thereof. The cord (71) is molded as part of a planar member, providing a cord body. Presently, the cord body is in the form of a disc-like ring (72). This eliminates the risk of the cord tangling before initial distribution thereof, and also eliminates the need for a cord binder to be provided for the cord itself to be bound, as well as the requirement for placement in a bag. Such units may then be bulk-packed as is, which reduces additional packaging requirement. This in turn reduces manual labour and material requirements.

While indentations (26) are still provided on the stem (14), it should be noted that the stem does not include a socket which is created by a pin during molding thereof. An advantageous curing, freezing or solidifying time (as appropriate) may still be achieved by the presence of indentations despite the absence of a pin during the molding process, as the thickness of the material though which heat must travel is still reduced by the presence of such indentations.

In this embodiment, the indentations also allow for less material requirements, leading to an associated reduction in cost of manufacturing.

The disc-like ring (72) defines a plurality of sulcations (74) in a circular or labyrinth-like pattern. The sides of the cord are still attached to form the cord body provided by the circular, disc-like shape. The sulcations may be expected to be cut into the ring (72) after molding, possibly while the set is still in the mould. Alternatively, lines of weakness may be molded into or cut in to the ring. The sulcations or lines of weakness allow tearing of the cord body therealong to form the cord. Before first use of the earplugs, a user may tear the disc along the sulcations or lines of weakness, thereby separating adjacent parts of the cord and forming it into an elongate shape suitable for use.

The sulcations or lines of weakness may be provided in any suitable pattern, and may provide the appearance of a spirally wound cord. It should be noted that when a planar member is used, a cord torn therefrom may be expected to be rectangular in cross-section. It is, however, foreseen that the planar member may be corrugated, with lines of weakness being formed between adjacent corrugations. Using such a corrugated planar member may result in a cord with a more rounded profile in cross-section.

While earplugs similar to that shown in FIG. 1 are shown in FIGS. 6 and 7, it will be appreciated that any suitable type of earplug may be integrally molded with a cord as described above.

Figure 8:
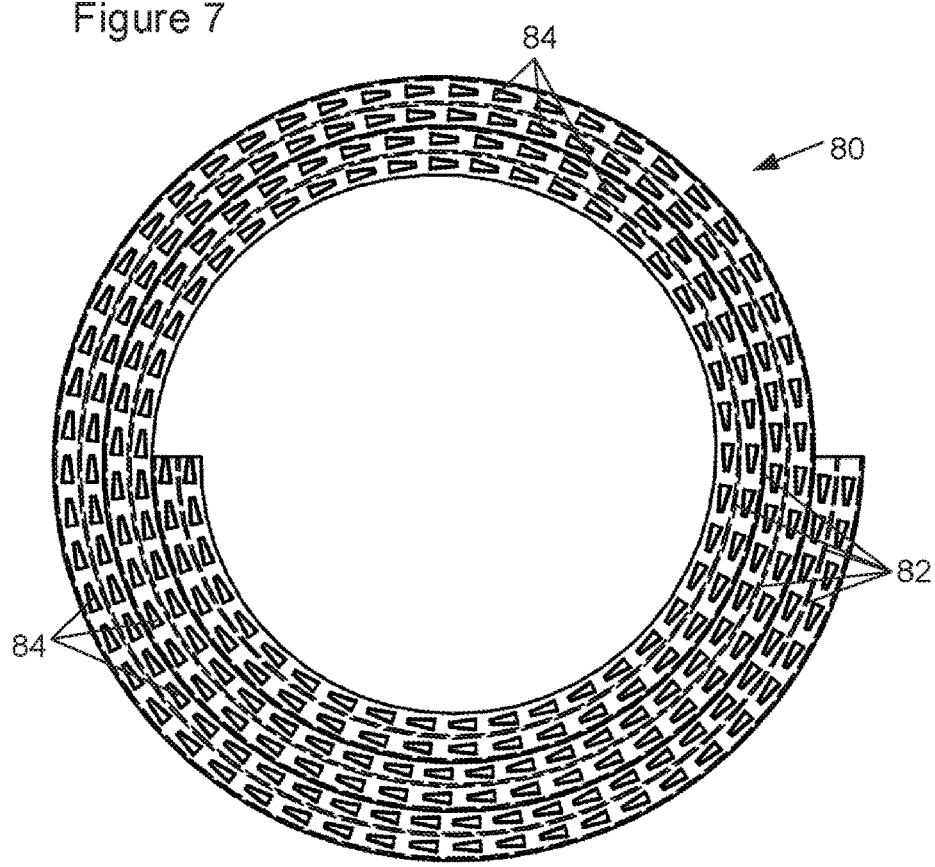
FIG. 8 illustrates, schematically, a top view of a cord according to a further aspect of the invention, an integrally molded cord being provided in the form of a spirally wound planar disc-like ring which defines a line of weakness and includes sound reflecting formations.

FIG. 8 shows a cord (80) for a set of earplugs according to an embodiment of a further aspect of the invention. The cord (80) is molded into a spirally wound planar disc-like ring, as described above with reference to FIGS. 6 and 7. A line of weakness (82) extends between adjacent, attached parts of the cord. Tearing of the ring from its disc-like shape along the line of weakness (82) will provide the cord in an elongated, separated condition.

The cord includes sound reflecting formations (84), presently triangularly shaped, projecting outwardly from an outer surface thereof. The formations (84) are spaced apart by about 2 mm along the length of the cord and are ramped, with a lower side of the ramp located toward a middle section of the cord in the separated condition and a higher side of the ramp location on an earplug side of the cord in the separated condition. The triangles are arranged such that an apex of one triangle faces the base of an adjacent triangle, and the apex of the triangle faces an end of the cord that will typically be secured to or connected to an earplug.

In the present embodiment, the terminal ends of the cord located at an innermost side of the ring are configured to be connected to earplugs, while the terminal ends located on the outside of the ring are intended to remain attached to each other in the separated condition of the cord. As a result, the thinner end of the triangular-shaped sound reflecting formations is located on an earplug side of the cord, and a wider end is located on the base, from where it ramps upward toward the thinner end. At the midway point of the cord in its separated condition, the direction of the sound reflecting formations is reversed along the length of the cord.

The ramp may only rise to a height of about 0.2 mm above the outer surface of the cord; however, this may have a notable impact on sound transmission within the cord. Sound waves travelling through the cord may travel into the ramp, where they may contact the raised ramped section and be reflected backwards. As a result, sound waves travelling along the cord may be damped by such sound reflecting formations.

It will be apparent that many different types of sound reflecting formations may be provided on the cord. In particular, apart from the described triangular shapes, conical, trapezoidal, conical with non-straight edges, triangular with curved edges, or connected truncated cone shapes may be provided. All such formations may be arranged such that an apex of one formation faces the base of an adjacent formation, as applicable. It should be noted that the low protrusion of the formations in the present embodiment may prevent the formations from catching on something like the clothes of a user and be pulled from a user's ear. Additionally, the cord according to this aspect of the invention may be used with any types of earplugs, and not just the domed flange-type described with reference to the representations.

It should be noted that the sound reflecting formations may protrude into, rather than out from, the cord. Such protrusion may be at a height of from about 0.1 mm to about 0.4 mm inclusive in either direction. Additionally, the spacing of such formations along the length of the cord may be expected to be from about 0.5 mm to about 4 mm (inclusive) apart.

Figure 9:
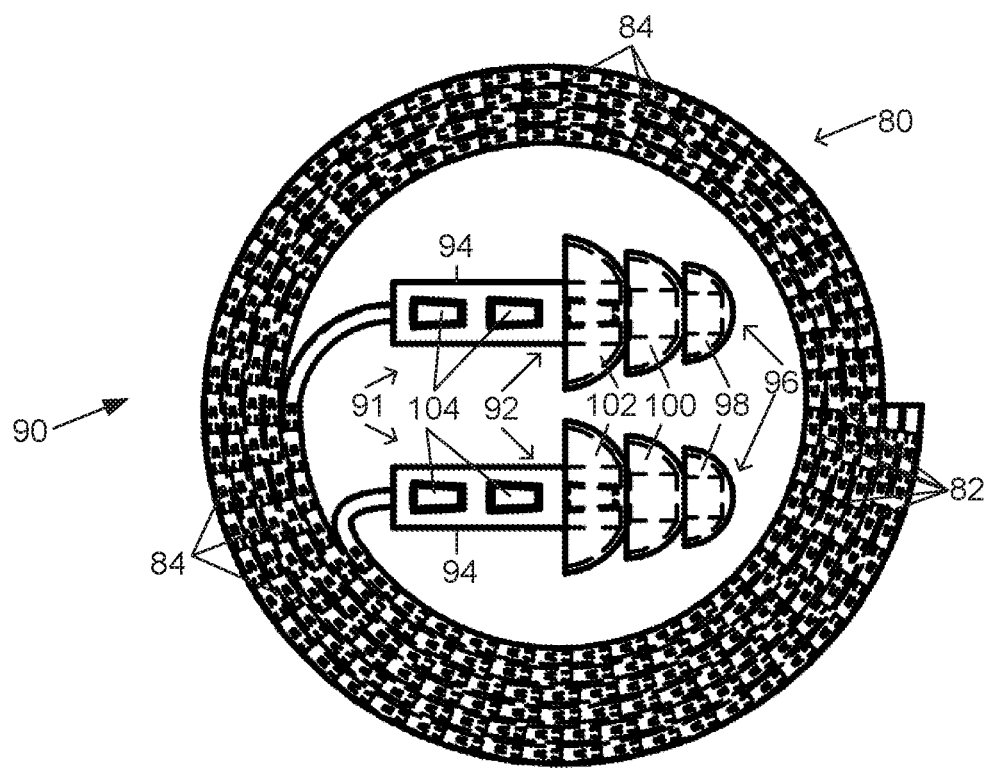
FIG. 9 illustrates, schematically, a top view of an embodiment of an earplug set combining, amongst other features, those represented in FIGS. 6 to 8.
Figure 10:
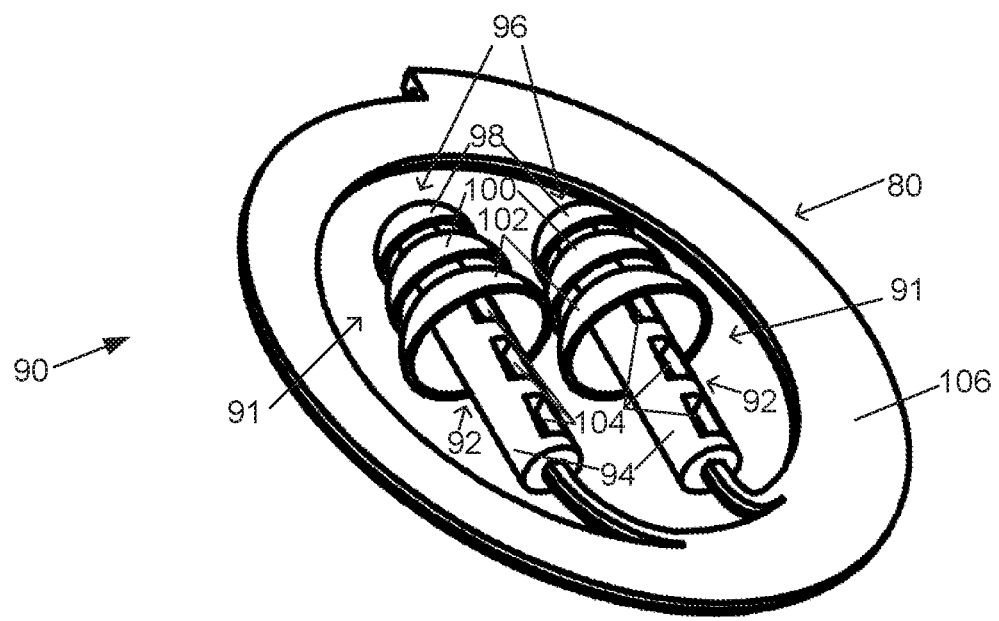
FIG. 10 illustrates, schematically, a three-dimensional view of the bottom of the earplug set of FIG. 9.

FIGS. 9 and 10 show an earplug set which incorporates features of two previously described aspects of the invention. Thus, the drawings show a cord with a pair of earplugs (91) attached thereto and integrally molded therewith, providing an earplug set (90). Like features and components of the cord of FIG. 8 are indicated by like reference numerals in FIGS. 9 and 10. The earplugs are again of the type that includes a body (92) defining an elongate stem (94) providing a grip at one end and having a nose (96) at the opposite end, with a set of three sound dampening formation in the form of domed flanges (98, 100, 102) provided towards the nose end, with free ends of the flanges and facing the grip end. The flanges (98, 100, 102) are spaced at intervals along the length of the stem (94) and incrementally increase in size, with a smallest (98) of the flanges located at the tip of the nose end and a largest (102) of the flanges located the furthest away therefrom and being the outermost flange. A plurality of trapezoidal indentations (104) are provided on the stems (94) and serve to reduce material use as described above.

The cord (80) is attached to the ends of the stems.

To form the disc-like ring into an elongate cord, it may be torn along lines of weakness (82) cut therein. The sound reflecting protrusions (84) on the cord may then serve to dampen sound waves and other vibrations travelling along the cord in use and as described above with reference to FIG. 8. The ends of the cord located away from the earplugs (91) may be expected to remain attached, providing a single elongate cord. The connection at these ends may be strengthened to prevent accidental separation thereof.

It should be noted that the bottom (106) of the earplug set is visible in FIG. 10. As can be seen, the lines of weakness do not extend all the way through the disc-like ring. Instead, the ring is only partially cut, preventing unwanted tearing of the cord into its elongate shape prior to deliberate separation thereof.

Figure 11:
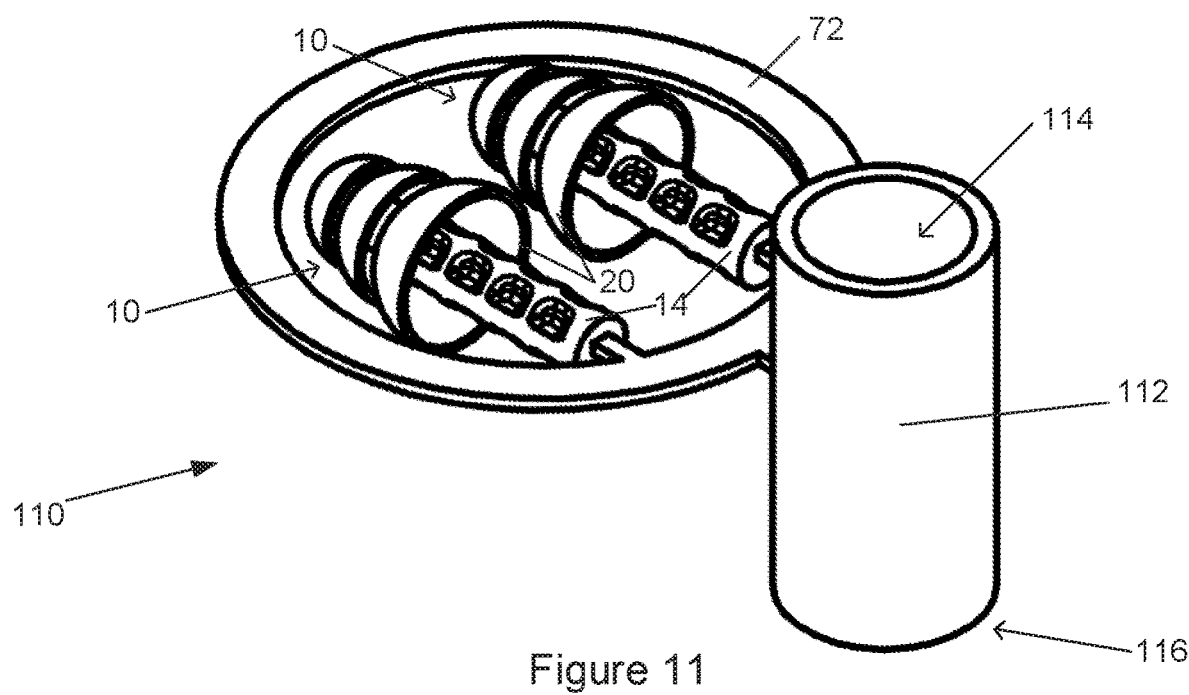
FIG. 11 illustrates, schematically, a three-dimensional view of an embodiment of an earplug set according to a further aspect of the invention, the set providing, amongst other features, a storage container for the earplugs.
Figure 12:
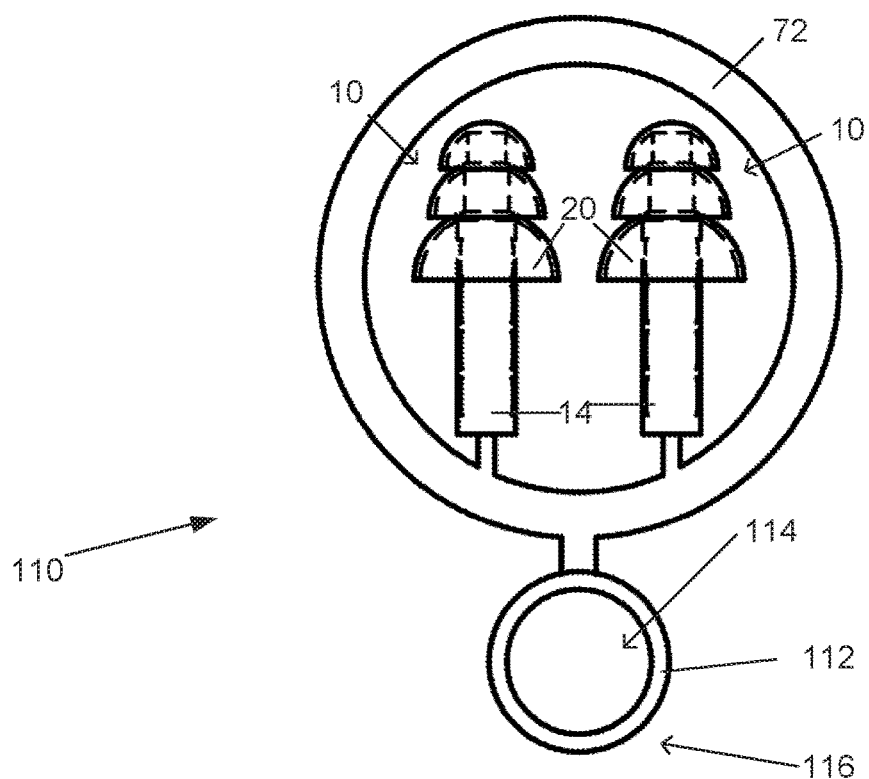
FIG. 12 illustrates, schematically, a top view of the earplug set of FIG. 11.

FIGS. 11 and 12 show an earplug set (110) according to an embodiment of a further aspect of the invention. The set includes an integrally molded pair of earplugs, a cord or lanyard in the form of a disc-like ring, and a container (112) for the earplugs. The earplugs (10) and disc-like ring (72) are identical to that described with reference to FIG. 6 above, and like reference numerals indicate like components and features when required. The container (112) is a new addition, and is attached to the ring (72) at a position that will form the midway point of the cord when in its separated condition. This provides a balanced earplug set.

The container (112) is provided by a tube. The tube has opposing open ends (114, 116) and is shaped to accept at least the largest flanges (20) of the earplugs in a friction fit.

Prior to first use of the earplug set, a user may release the cords or sulcations from the ring to present the elongate cord. The container will remain attached to the cord. When a user wishes to store the earplugs between uses, they may insert the nose ends of the earplugs into opposing open ends (114, 116) of the tube. The largest flange (20) of each earplug will engage the inner side walls of the tube (112) in a friction fit, thereby lodging the earplugs (10) in a storage position therein. This protects the nose ends of the flanges from gathering dust or other foreign materials, which may prevent such dust or foreign materials from being introduced into a user's ear. The open ends of the tube thereby form two cavities for receiving the nose ends of the earplugs.

The stems (14) may be expected to protrude from the open ends in the storage position of the earplugs, thereby allowing a user to pull on it and remove the earplugs from the tube when the user wishes to use them again. While the cord will dangle freely from the container during this storage condition of the earplugs, it may be expected that the cord will be less likely to become tangled as there will not be free ends thereof, which may reduce the possibility that a knot or the like may form during storage.

It will be appreciated that the container need not be located at the midpoint of the cord, but may be located anywhere along the length thereof.

It should be noted that the container may extend from the grip of an earplug or from a cord extending from the grip. The container may, however, be expected to be integrally molded with the cord.

Figure 13:
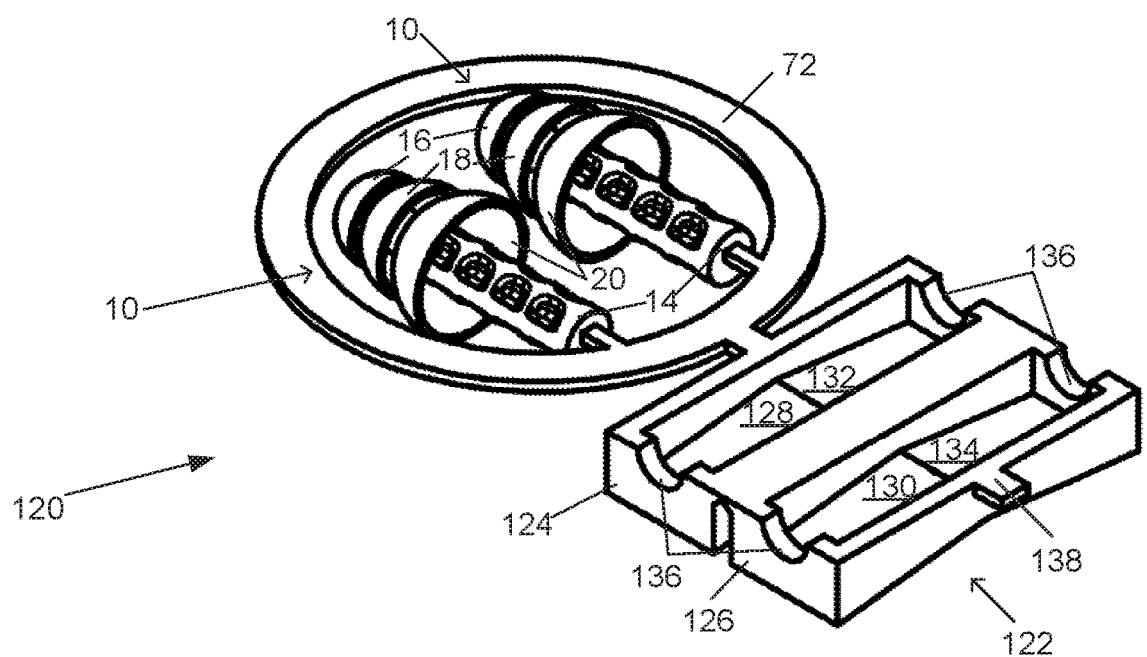
FIG. 13 illustrates, schematically, a three-dimensional view of a further embodiment of an earplug set providing a storage container for the earplugs.

FIG. 13 shows a further embodiment of an earplug set (120) according to the present aspect of the invention. Again, a set of earplugs, a cord in the form of a disc-like ring, and a container (122) are provided by the earplug set. The earplugs (10) and disc-like ring (72) are identical to that described with reference to FIG. 6 above, and like reference numerals indicate like components and features when required. The entire set is integrally molded as part of a single mould.

The container (122) of the present embodiment includes a base (124) and a lid (126) connected to each other. The base (124) and lid (126) respectively include two halves of cooperating cavity pairs (128, 130; and 132, 134), which may also be referred to as socket pairs. Opposing side walls of the base and lid each define half a circular port (136) configured to allow the stems (14) of the earplugs to protrude therethrough.

In use, the cord may be formed into its elongate shape as described previously. When a user wishes to store the earplugs, they may place the nose ends including the flanges (16, 18, 20) of the earplugs (10) into the first of the cavity pairs (128, 132) in the base (124) and close the lid thereover. The cavity pairs (128, 130; and 132, 134) form a complete cavity which holds the nose end of the earplugs captive therein. The half circular ports (136) on the respective side walls of the base and lid form circular portals through which the stems of the earplugs protrude. In this manner, the cavity may protect the nose ends of the earplugs during storage. The lid of the present embodiment is provided with a locking formation in the form of a closure tab (138), which may be inserted into a complementary slot (not shown) and which may retain the lid in its closed condition. The lid will be closed during storage of the earplugs, but may also be closed when not in use. When closed when not in use, the lid may at least partially prevent dust or other impurities from collecting on the interior of the cavity, which could otherwise then have been introduced to the flanges of the earplug during a next period of storage thereof. Removal of the tab from the slot may allow opening of the lid and, if closed during storage of the earplugs, allow removal of the earplugs from the cavity for further use.

It should be noted that the interior walls of the cavities are each ramped inwardly to form a wedged shape in the closed condition. The wedge may approach the outer profile of the flanges, thereby pressing on the flanges and retaining the earplugs in a press fit within the base and lid. Furthermore, the base and the lid may be interchangeably used, in that the closure tab (138) may also be provided on the base, and the earplugs may be placed in the lid, with the base closed thereover.

The provision of a holder and lid may lead to improved hygiene for users, a longer usage per earplug due to its continued suitability for use, and a more environmentally friendly and recyclable product due to the selection of material being the same as that of the earplugs.

Figure 14:
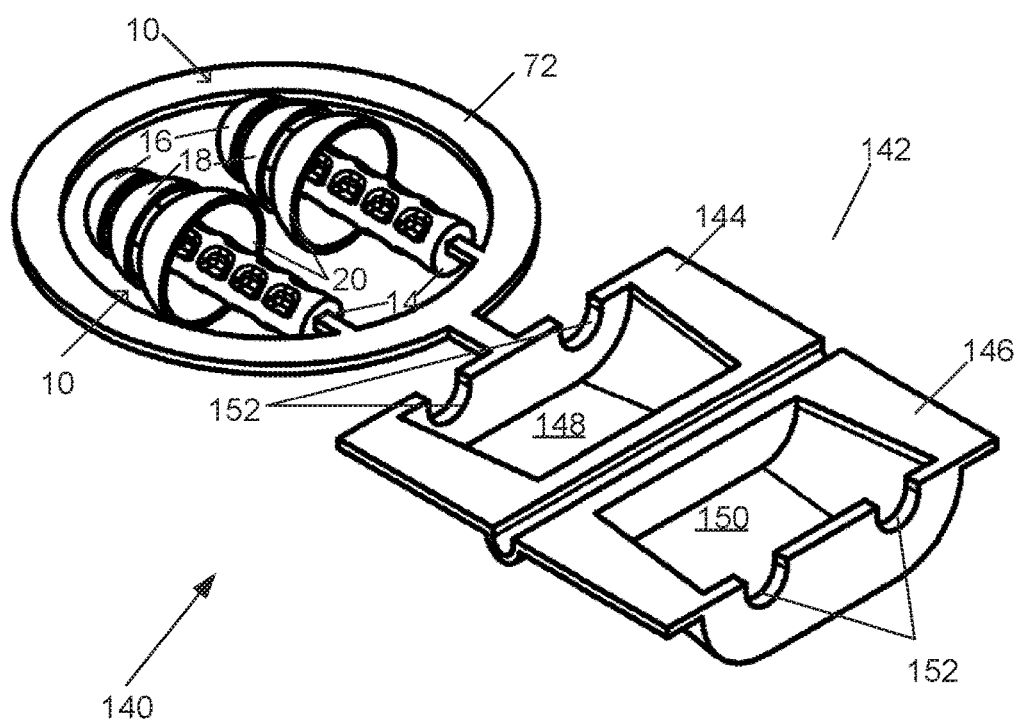
FIG. 14 illustrates, schematically, a three-dimensional view of yet a further embodiment of an earplug set providing a storage container for the earplugs.

FIG. 14 shows an additional embodiment of an earplug set (140) according to the present aspect of the invention. The set is similar to the one shown and described above with reference to FIG. 13 in that it includes a set of earplugs, a cord in the form of a disc-like ring, and a container (142). The earplugs (10) and disc-like ring (72) are identical to that described with reference to FIG. 6 above, and like reference numerals indicate like components and features. The entire set is integrally molded as part of a single mould.

The container (142) of the present embodiment includes a base (144) and a lid (146) that are hingedly connected to each other. The base (144) and lid (146) each define half of a cooperating cavity pair (148, 150). Side walls opposing the hinged connection between the lid and the base each define half a circular port (152) configured to allow the stem (14) of the earplugs to protrude therethrough.

In use, the cord may be formed into its elongate shape as described previously. When a user wishes to store the earplugs, they may place the nose ends including the flanges (16, 18, 20) of the earplugs into a first of the cavity halves (148) in the base (124) and close the lid thereover, hinging the container at the hinged connection. The cavity halves (148, 150) then form a complete cavity which holds the nose end of the earplugs captive therein. Pairs of half circular ports (152) on the respective side walls of the base and lid form circular portals through which the stems (14) of the earplugs protrude. In this manner, the base (144) and lid (146) of the container (142) may protect the nose ends of the earplugs during storage.

It should be noted that the interior of the cavity (148, 150) is delimited by opposing curved side walls that approach the outer profile of the flanges. The curved side walls may press on the flanges during storage of the earplugs and retain the earplugs in a press fit in the retaining formations.

Figure 15:
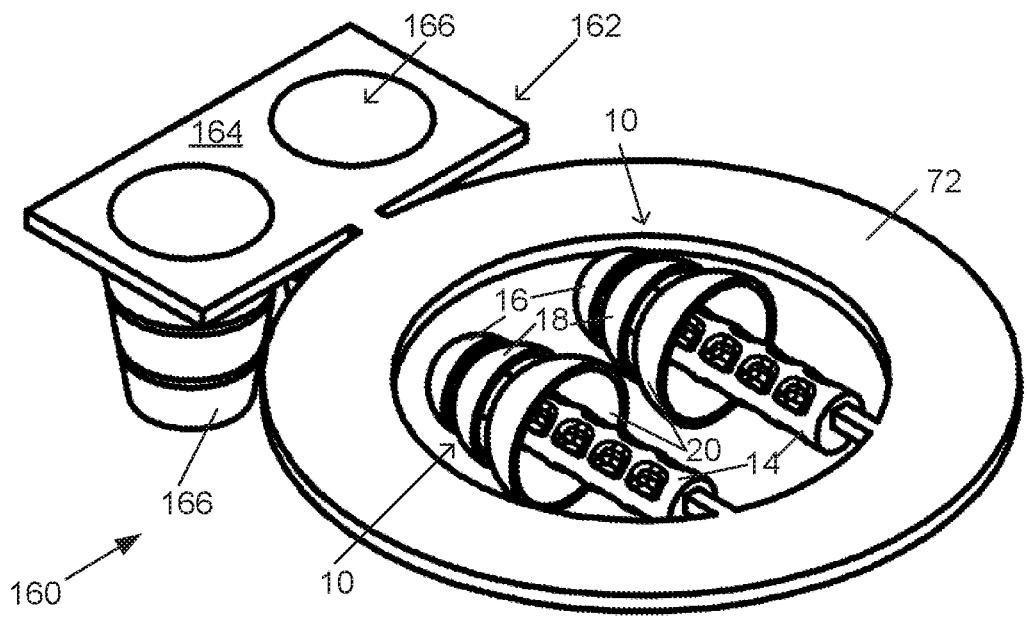
FIG. 15 illustrates, schematically, a three-dimensional view of yet another embodiment of an earplug set providing a storage container for the earplugs.
Figure 16:
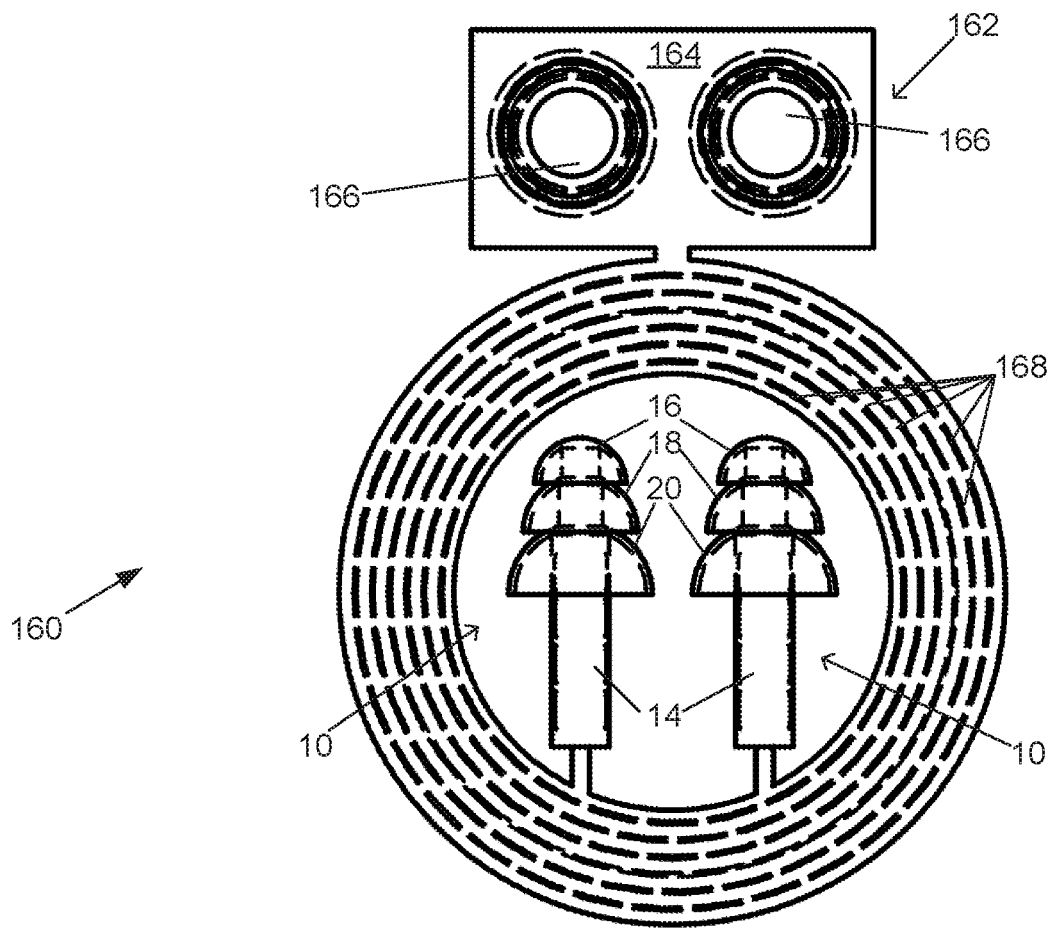
FIG. 16 illustrates, schematically, a top view of the earplug set of FIG. 15.

FIGS. 15 and 16 show a further embodiment of an earplug set (160) according to the present aspect of the invention. As before with FIGS. 11 to 14, the set (160) includes a pair of earplugs, a cord in the form of a disc-like ring, and a container (162). The earplugs (10) and disc-like ring (72) are substantially identical to that described with reference to FIG. 6 above, and like reference numerals indicate like components and features. The only notable difference is that the disc-like ring (72) is slightly wider. Its operation, however, is the same as that described above. The entire set is again integrally molded as part of a single mould.

The container (162) of the present embodiment includes a planar base (164) with two downward tapering cap formations (166) extending therefrom and defining cavities or sockets. The cap formations have the appearance of buckets, with an open top end at the planar base (164) and a blind bottom end.

In use, the cord may be formed into its elongate shape as described previously. In FIG. 16, lines of weakness (168) that allow this change of the disc-like ring are visible.

When a user wishes to store the earplugs (10), they may place the nose ends including the flanges (16, 18, 20) of the earplugs (10) into the cavities defined by the cap formations (166). The cap formations (166) receive the nose ends of the earplugs (10) in a friction fit, as the flanges (16, 18, 20) engage the tapered internal side walls of the cap formations. The stems (14) of the earplugs protrude through the open tops of the cavity of each cap formation (166), extending past the planar base (164). In this manner, the cap formations (166) may protect the nose ends of the earplugs during storage. The earplugs may then be removed from the cavities of the cap formations (166) when desired for use.

Figure 17:
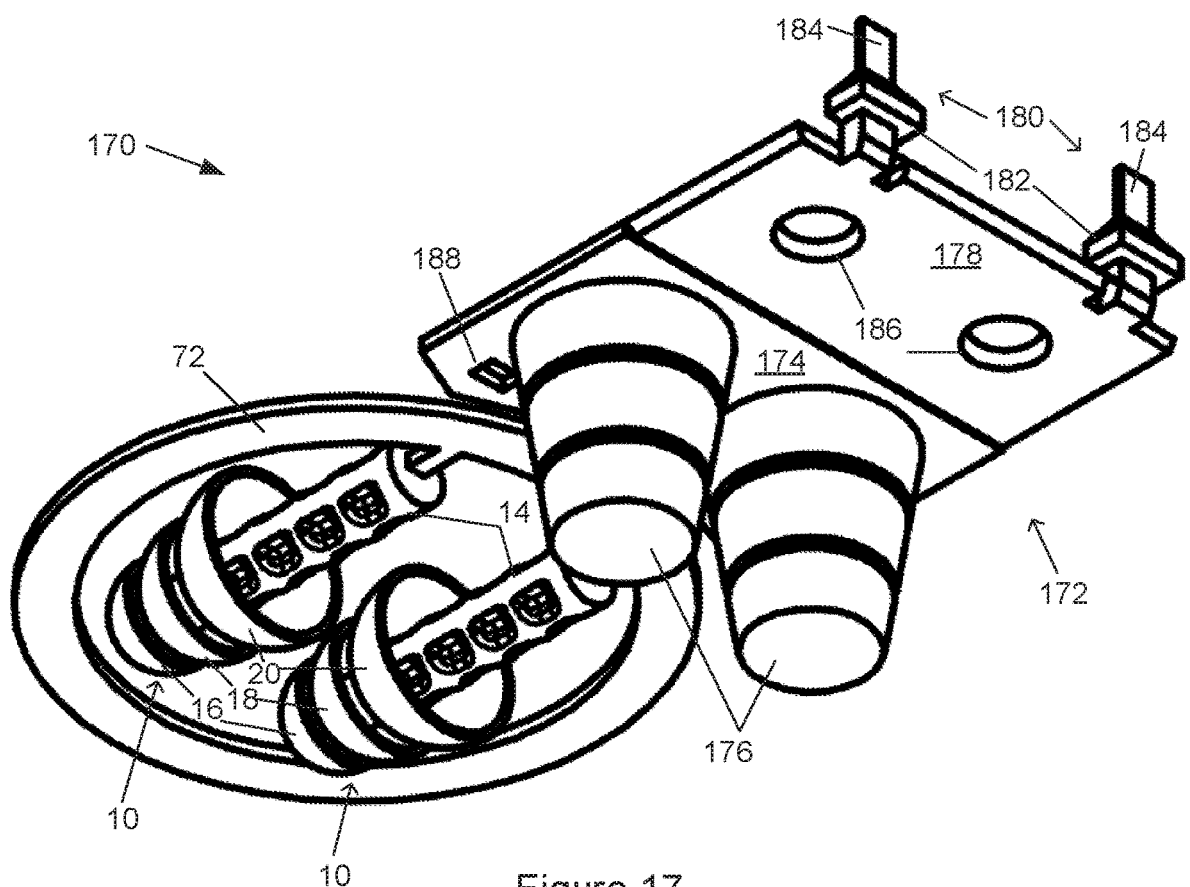
FIG. 17 illustrates, schematically, a three-dimensional view of a further embodiment of an earplug set providing a storage container for the earplugs.
Figure 18:
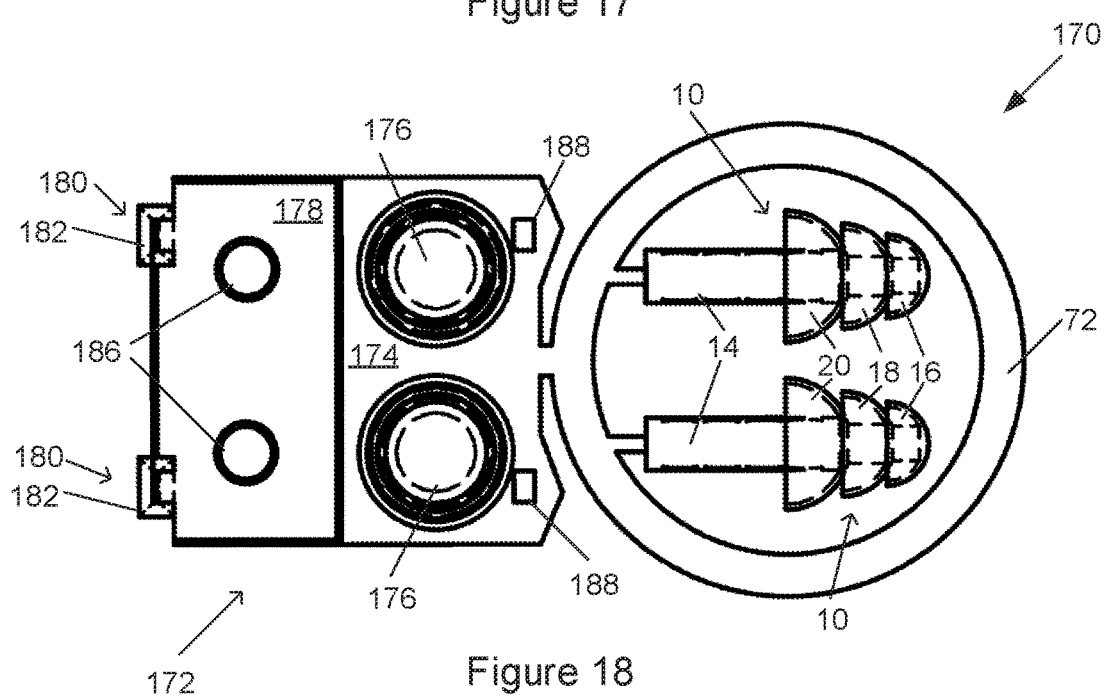
FIG. 18 illustrates, schematically, a top view of the earplug set of FIG. 17.

FIGS. 17 and 18 show a further embodiment of an earplug set (170) according to the present aspect of the invention. As before with FIGS. 11 to 16, the set (170) includes a pair of earplugs, a cord in the form of a disc-like ring, and a container (172). The earplugs (10) and disc-like ring (72) are identical to that described with reference to FIG. 6 above, and like reference numerals indicate like components and features where required. The entire set is again integrally molded as part of a single mould.

The container (172) of the present embodiment includes a planar base (174) with two downward tapering cap formations (176) extending therefrom and defining cavities or sockets. The cap formations have the appearance of buckets, with an open top end at the planar base (174) and a blind bottom end. Stop formation receiving apertures (188) are provided in the planar base (174).

A lid (178) is provided as part of the container (172) and is hingedly attached to the planar base (174). The lid (178) includes two attachment formations (180) defining tabs with radially stepped stop formations (182) thereon. The stop formations are located along the tabs so that each tab still includes a free end (184). Ports (186) are provided on the lid.

In use, the cord may be formed into its elongate shape as described previously. When a user wishes to store the earplugs (10), they may place the nose ends including the flanges (16, 18, 20) of the earplugs (10) into the cavities of the cap formations (176). The cap formations (176) receive the nose ends of the earplugs (10) in a friction fit, as the flanges (16, 18, 20) engage the tapered internal side walls of the cap formations. The stems (14) of the earplugs protrude through the open tops of the cavities, extending past the planar base (174).

The lid (178) may then be hinged at its hinged connection with the planar base (174) so as to cover the open top ends of the cavities (176). It should be noted that the lid is moved so that stems (14) of the earplugs then protrude through the ports (186) in the lid.

The free ends (184) of the tabs may be urged through the stop formation receiving apertures (188) in the planar base (174). A user may then pull on the free ends (184) to urge the radially stepped stop formations (182) through the apertures (188). It should be noted that the radial steps are larger in diameter than that of the apertures, however, the resiliently deformable nature of the plastics material that the earplug set is manufactured from allows the aperture to expand and deform, and the stop formations to compress and deform to allow the stop formations to pass through the aperture. Once past the aperture, the aperture substantially returns to its original size and the stop formation increases in size to its original size. Each radially stepped stop formation (182) forms a shoulder which locates behind its aperture (188), thereby retaining the lid in the closed condition.

In this manner, the cap formations may protect the nose ends of the earplugs during storage. The earplugs may then be removed from the cap formations (176) when desired for use. It will be apparent that the stop formations may be urged from the apertures in the opposite direction as before in order to release the lid and allow it to be opened.

Figure 19:
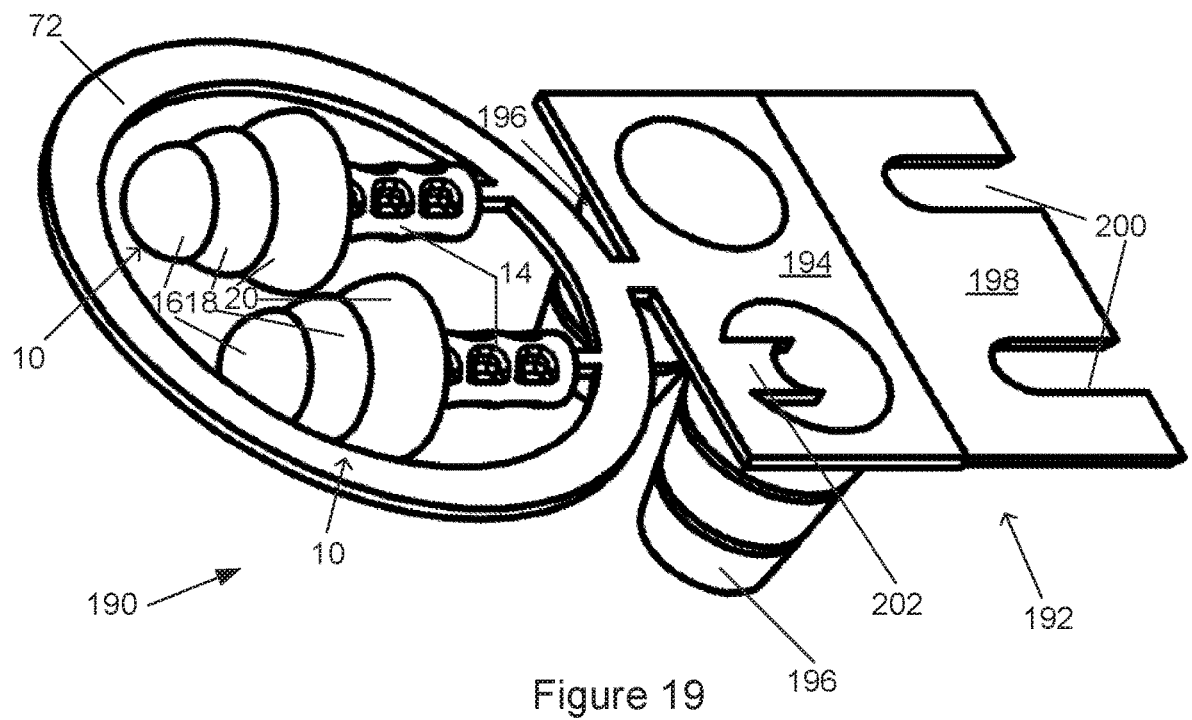
FIG. 19 illustrates, schematically, a three-dimensional view of yet a further embodiment of an earplug set providing a storage container for the earplugs.

FIG. 19 shows a further embodiment of an earplug set (190) according to the present aspect of the invention. As before with FIGS. 11 to 14, the set (190) includes a pair of earplugs, a cord in the form of a disc-like ring, and a container (192). The earplugs (10) and disc-like ring (72) are substantially identical to that described with reference to FIG. 6 above, and like reference numerals indicate like components and features. The entire set is again integrally molded as part of a single mould.

The container (192) of the present embodiment includes a planar base (194) with two downward tapering cap formations (196) extending therefrom and defining cavities or sockets. The cap formations have the appearance of buckets, with an open top end at the planar base (194) and a blind bottom end. A lid (198) is provided that is hingedly attached to the planar base (194). The lid defines two grooves (200) extending partially across the width of the lid and from a side wall opposite the hinged connection. A seating formation (202) is provided which protrudes into the open top of one of the cap formations and includes a semi-cylindrical free end proximate a middle region of the open top thereof.

In use, the cord may be formed into its elongate shape as described previously. When a user wishes to store the earplugs (10), they may place the nose ends including the flanges (16, 18, 20) of the earplugs (10) into the cavities (196). The cavities (196) receive the nose ends of the earplugs (10) in a friction fit, as the flanges (16, 18, 20) engage the tapered internal side walls of the cap formations. The stems (14) of the earplugs protrude through the open tops of the cavities, extending past the planar base (194). The lid (198) may be hinged to partially close the open top ends of the cavities (196), with the stems (14) of the earplugs protruding through the grooves (200). The stem (14) of the earplug (10) in the cap formation with the seating formation may be seated in the seating formation. This may assist in retaining the earplug in place.

In this manner, the cap formations (166) may protect the nose ends of the earplugs during storage. The earplugs may then be removed from the cap formations (166) when desired for use. It will be apparent that the earplug, when seated in the seating formation (202), may in certain circumstances act as a locking formation to lock the lid (198) over the base (194), as when the fit of the grooves (200) around the stems (14) is a friction fit sufficient to grip the stems (14).

Instead or in addition, a different appropriate locking formation may be provided which may hold the lid (198) in place when required.

Figure 20:
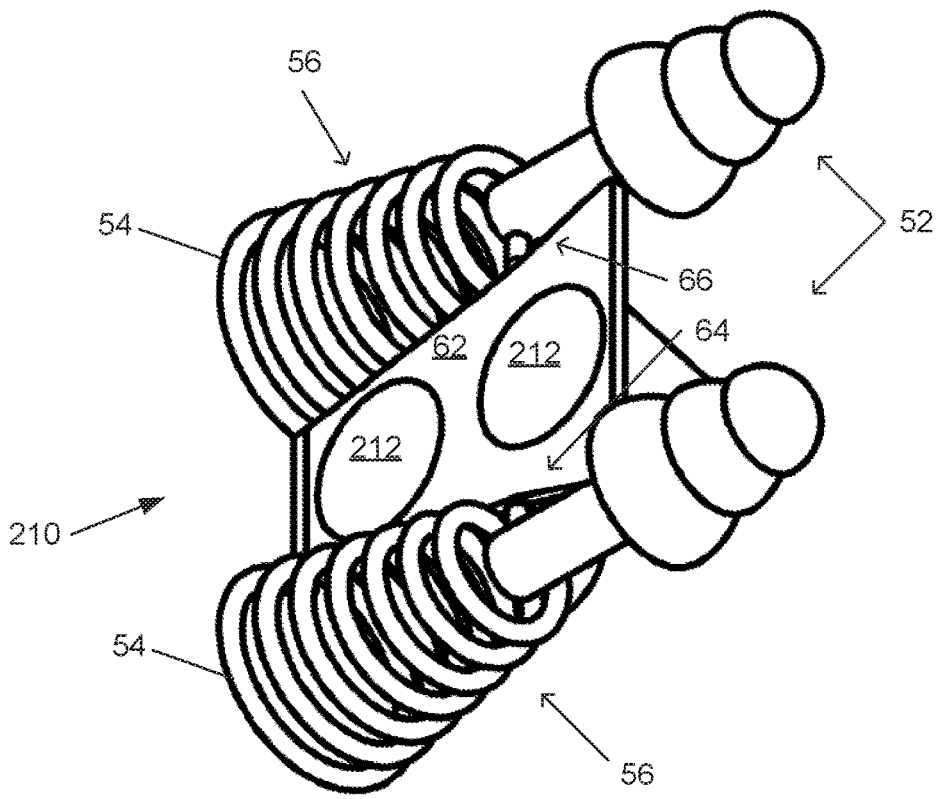
FIG. 20 illustrates, schematically, a three-dimensional view of yet another embodiment of an earplug set providing a storage container for the earplugs.

FIG. 20 shows a further embodiment of an earplug set (210) according to the present aspect of the invention. The earplug set is similar to that described with reference to FIG. 5 above, and like reference numerals are used to indicate like features and components. The earplug set includes the same two earplugs (52) and a cord (54) connecting the two earplugs (52). A notable difference is the attachment of the cord (54) to the stem (14) of the earplugs. In this embodiment, the cord is not partially coiled around the shaft—rather, it directly approaches the side wall of the stem (14). The planar member (62) is still attached to two coiled sections (56), with the coils in the coiled sections (56) being attached to adjacent sides (64, 66) of the planar member (62). In this embodiment, however, the planar member further defines two downward tapering cap formations (212) extending therefrom. The cap formations have the appearance of buckets, with an open top end at the planar member (62) and a blind bottom end.

In use, the cord may be formed into its elongate shape as described previously. When a user wishes to store the earplugs (52), they may place the nose ends including the flanges of the earplugs (52) into the cavities defined by the cap formations (212). The cap formations (212) receive the nose ends of the earplugs (52) in a friction fit, as the flanges engage the tapered internal side walls of the cap formations. The stems of the earplugs protrude through the open tops of the cavities, extending past the planar member (62). In this manner, the cap formations may protect the nose ends of the earplugs during storage. The earplugs may then be removed from the cavities (212) when desired for use.

Figure 21:
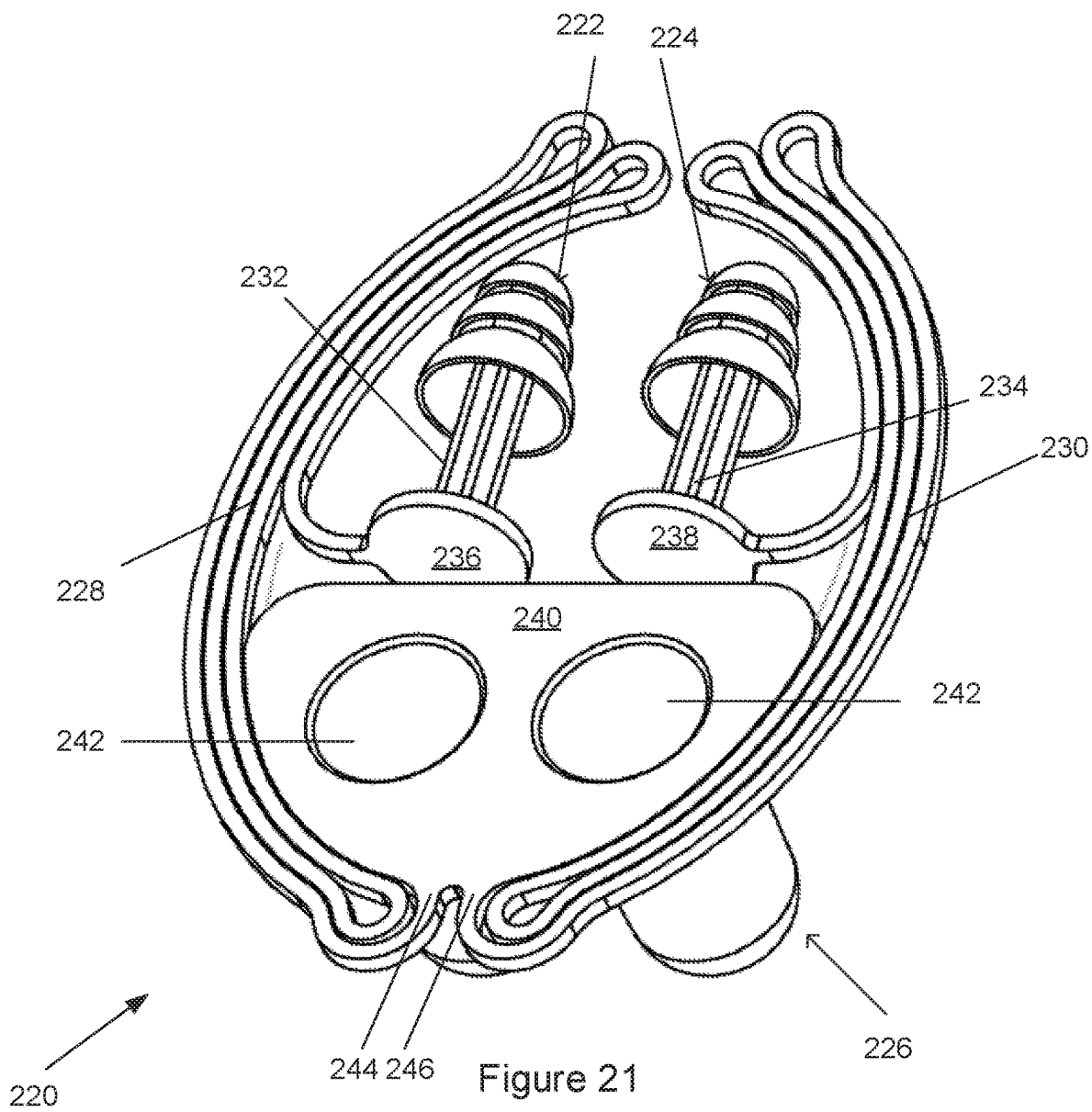
FIG. 21 illustrates, schematically, a three-dimensional view of a further embodiment of an earplug set providing a storage container for the earplugs.

FIG. 21 shows a further embodiment of an earplug set (220) according to the present aspect of the invention. The set (220) includes a pair of earplugs (222, 224) and a container (226). Each earplug (222, 224) is connected to the container (226) via its own cord (228, 230). The earplugs (222, 224) are of a domed flange type as described above, but in this embodiment do not define indentations on the stems (232, 234) thereof. The entire set (220) is again integrally molded as part of a single mould.

The cords (228, 230) are rectangular in cross-section and are molded to appear folded onto themselves, with adjoining sections of each cord lying alongside each other between folds. The cords (228, 230) are connected at adjacent sections thereof as a result of the molding process. Lines of weakness or sulcations may be cut between the adjoining sections to simplify release. Each cord (228, 230) is connected at its first end to a disc (236, 238) at a stem end of the respective earplugs (222, 224).

The container (226) of the present embodiment includes a planar base (240) with two downward tapering cap formations (242) extending therefrom and defining cavities or sockets. The cap formations (242) terminate in closed, blind ends away from the base (240), Second ends of the cords (228, 230) are connected to the base (240) at connection points (244, 246). It should be noted that the cords (228, 230) also adjoin the side of the planar base (240) in the folded state shown. Lines of weakness or sulcations may similarly be cut between the base and its adjoining sections of cord.

In use, each cord may be individually torn from its folded state shown to release the connections between each adjoining section, as well as between the planar base and its adjoining sections of cord. The container (226) will then serve as a link between the two sections of cord (228, 230), linking the earplugs (222, 224) together via the cords (228, 230).

When a user wishes to store the earplugs (222, 224), they may place the earplug nose ends including the flanges into the cavities defined by the cap formations (242). As described above with reference to FIGS. 15 and 16, the cavities (242) receive the earplugs (222, 224) in a friction fit, as at least the largest flanges engage the tapered internal sides of the cap formations. The stems (232, 234) of the earplugs may protrude through the open tops of the cavities, extending past the planar base (240). In this manner, the cap formations may protect the nose ends of the earplugs during storage. The earplugs may then be removed from the cavities (242) when desired for use.

Figure 22:
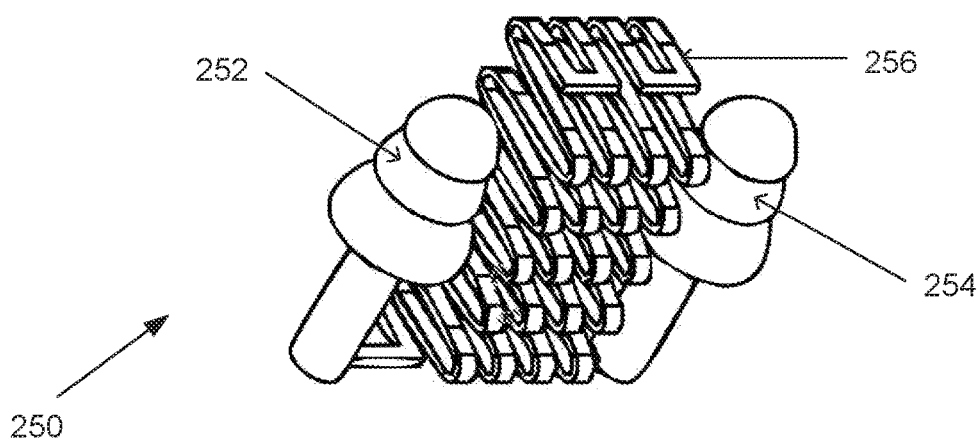
FIG. 22 illustrates, schematically, a three-dimensional view of an earplug set according to an aspect of the invention that is similar to the aspect represented in FIGS. 3 to 7, this set additionally providing a zig-zag molding of the cord.

FIG. 22 shows an embodiment of an earplug set (250) according to an aspect of the invention similar to that illustrated and exemplified in FIGS. 4 to 7. The set includes two earplugs (252, 254) and a cord (256) connecting the two earplugs (252, 254), which are all integrally molded at the same time.

The earplugs (252, 254) are again of the domed flange type as described above. In this embodiment, the cord (256) connecting the two earplugs is molded in a zig-zag fashion. It should be noted that adjacent sections of the cord are not connected. Molding of the cord in this zig-zag fashion may provide a form of elasticity to the cord, whereby the zig-zagged sections may be stretched out to allow a user to place the earplugs in their ears, but wherein the cord at least partially returns to its zig-zag shape shown when tension in the cord is released. This may be when the user takes the earplugs out of their ears. This may reduce the tendency of cords to become entangled when placed in a user's pocket or when another similar storing means is used. A tendency of the cord to return to its zig-zag shape may also cause the cord to return to this shape when worn by a user, resulting in the cord hanging partially in a zig-zag fashion from the users' ears during use.

The cord may be molded into any desirable shape whilst retaining the advantages of integral molding with the earplugs as described above. For example, the cord may be molded such that the cord doubles back on itself, as illustrated in FIGS. 21 and 25.

Figure 23:
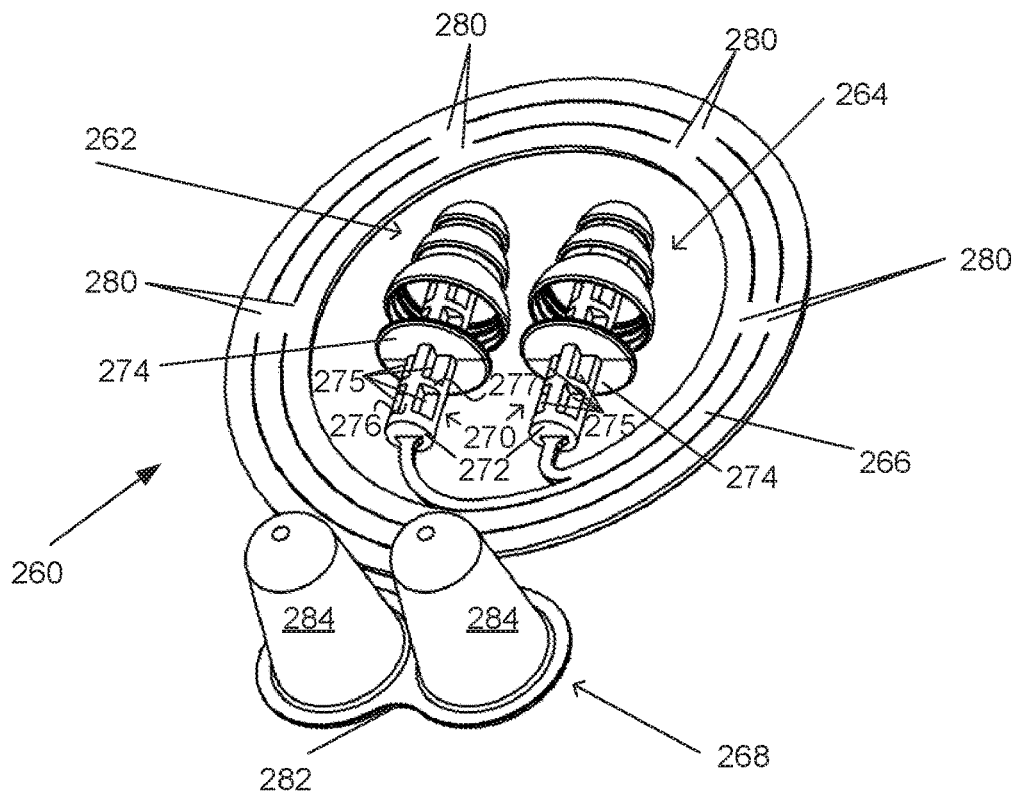
FIG. 23 illustrates, schematically, a three-dimensional view of an earplug set according to an aspect of the invention similar to that represented in FIGS. 11 to 21, the present set additionally providing a locating disk on each earplug, with a complementarily-shaped rim on the storage container.
Figure 24:
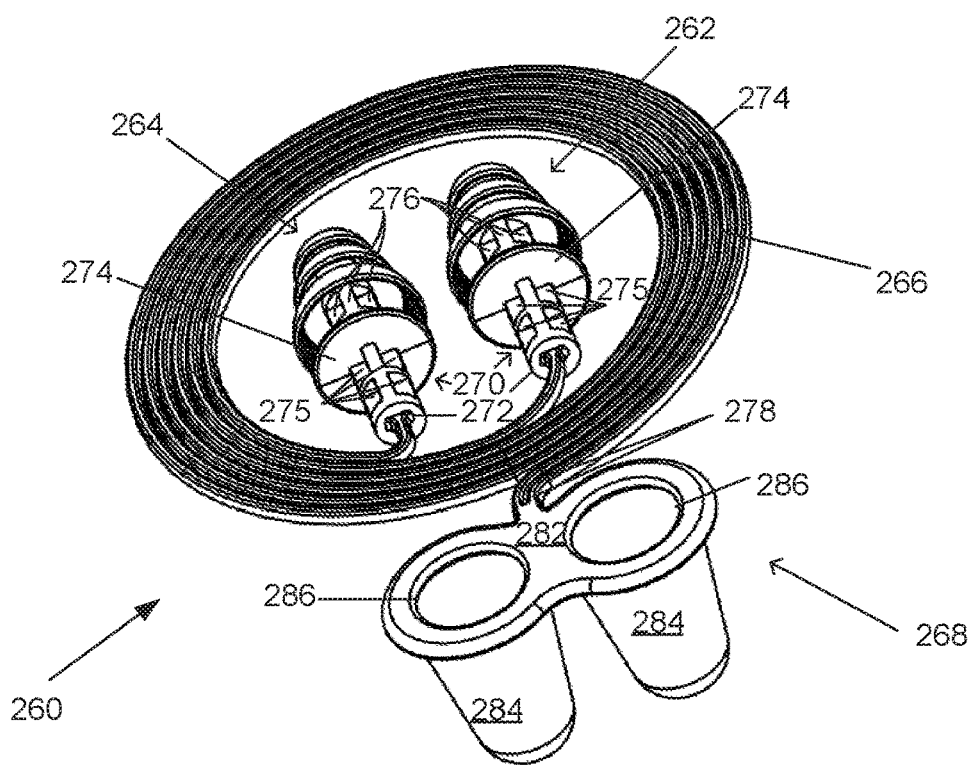
FIG. 24 illustrates, schematically, another three-dimensional view of the earplug set of FIG. 23.
Figure 29:
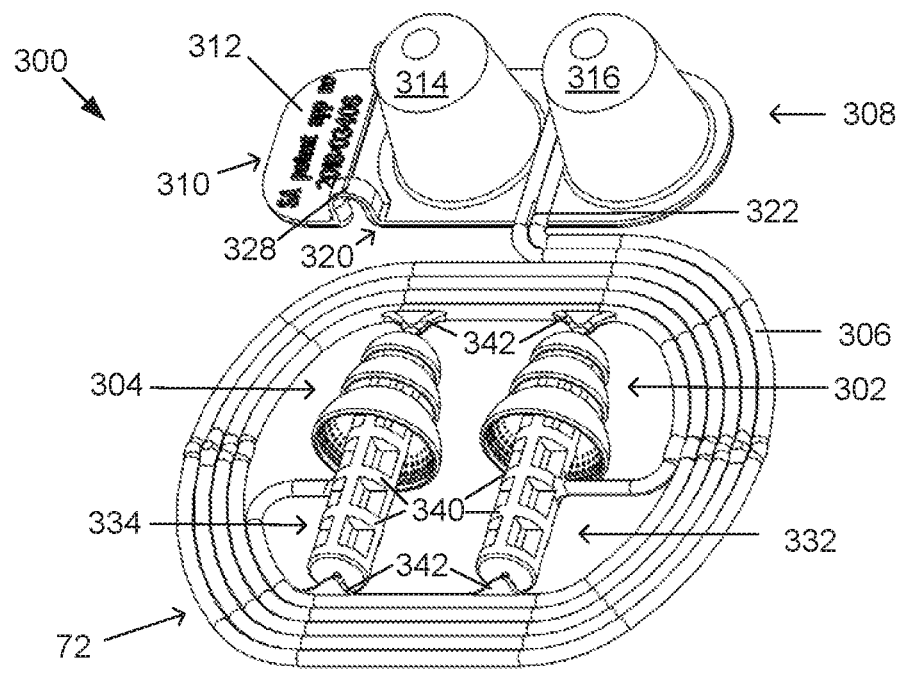
FIG. 29 illustrates, schematically, a three-dimensional top view of the earplug set of FIG. 25.
Figure 30:
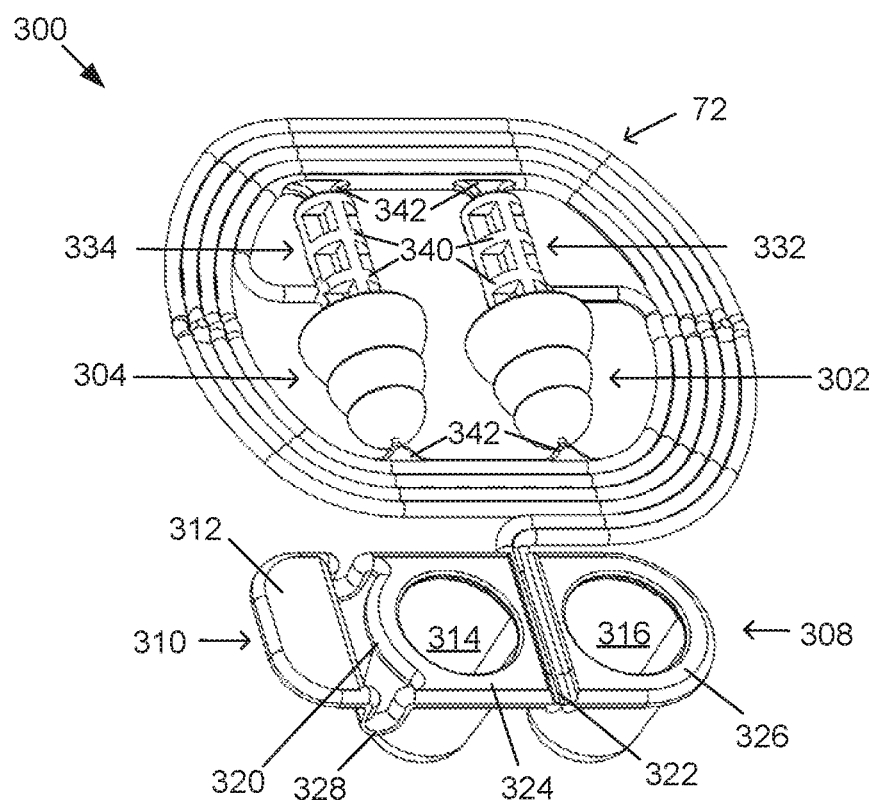
FIG. 30 illustrates, schematically, a three-dimensional bottom view of the earplug set of FIG. 25.
Figure 31:
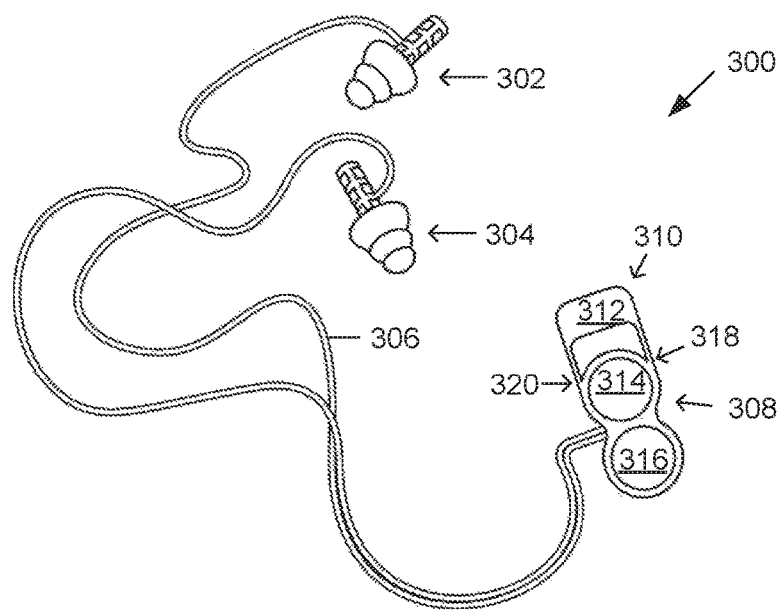
FIG. 31 illustrates, schematically, a top view of an earplug set similar to that of FIGS. 25 to 30, wherein adjacent lengths of a cord have been separated from each other by tearing along a line of weakness.
Figure 32:
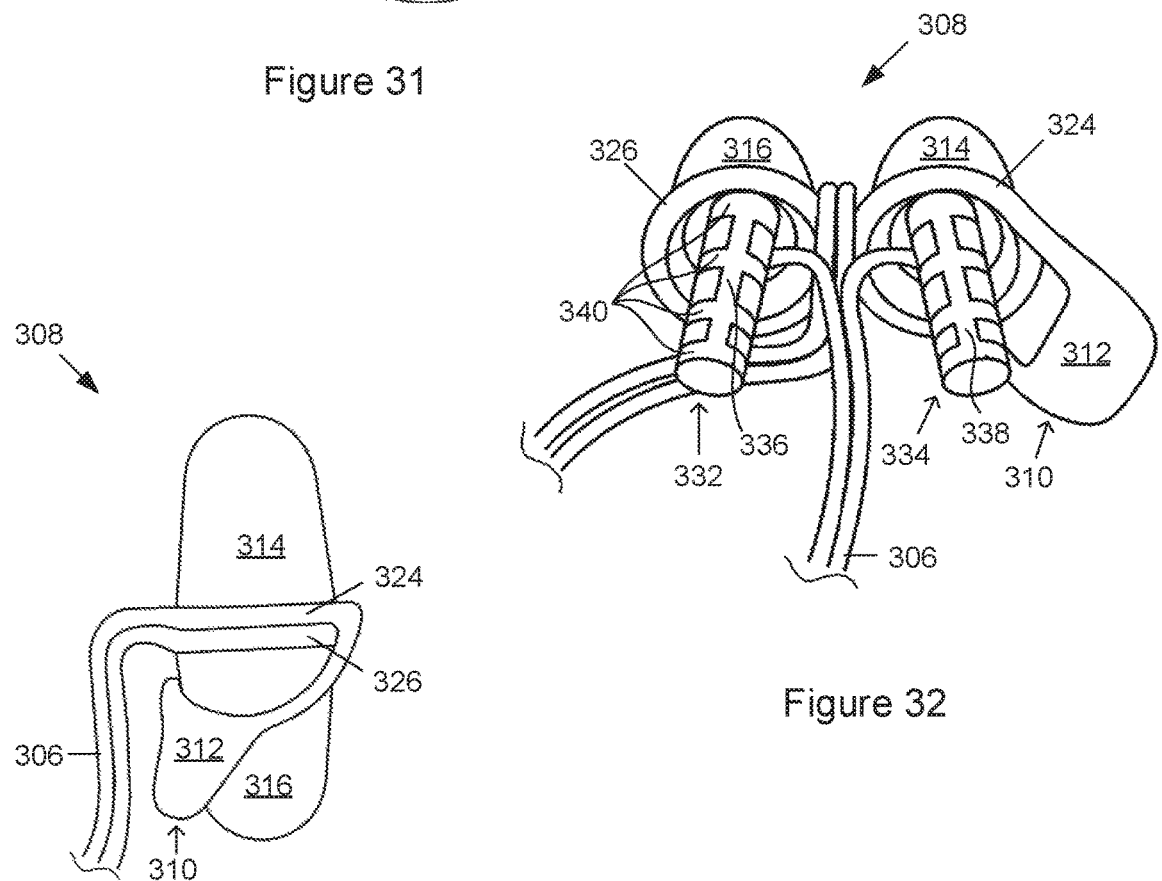
FIG. 32 illustrates, schematically, a three-dimensional view of part of an earplug set similar to that of FIGS. 25 to 30, showing detail of two earplugs in condition for storage seated in the cavities of two cap formations.

FIGS. 23 and 24 show an embodiment of an earplug set (260) according to an aspect of the invention similar to that illustrated and exemplified in FIGS. 11 to 21. The set (260) includes two earplugs (262, 264) and a cord (266) connecting the two earplugs (262, 264) via a storage container (268). All elements of the set (260) are integrally molded at the same time.

The earplugs are of the general domed flange type described above. Each earplug includes a body (270) defining an elongate stem (272). The stem (272) provides a grip at one end of the earplug (262, 264). Sound dampening formations in the form of three generally hemispherically-shaped domed flanges are provided at an opposite nose end of the stem (272), as was described above with reference to previous representations. Each domed flange forms a resiliently deformable skirt of relatively uniform thickness. Free ends of the flanges face away from the nose end and are directed at the grip. The flanges are spaced at intervals along the length of the stem (272) and incrementally increase in size along the length of the stem (272), with a smallest flange being located proximate the tip of the nose end and a largest flange being located the furthest therefrom and being the outermost flange.

In this embodiment, a locating member in the form of a locating disc (274) is provided on each earplug and intermediate its stem end and its largest flange.

Indentations (275) are provided on the outer surface of the stem (272) and are arranged along the length of the stem so that a distance from any point in the stem to the outer surface of the grip is less than the radius of the stem.

The indentations (275) are defined and delimited by four elongate ridges (276) which extend longitudinally along the length of the grip, and five mutually spaced wall formations (277) which project generally transversely from and connect the ridges at intervals. In combination with one another, the ridges have a generally cross-shaped cross-section.

The cord (266) includes two parts, with a first part extending between the one earplug (262) and the container (268), and the other extending between the other earplug (264) and the container. The two parts of the cord are connected to the container at connection points (278). In the molded condition shown and prior to first use of the earplug set, the two parts of the cord (266) are spirally wound to provide a disc-like ring around the earplugs (262, 264). The two parts of the cord include a thin, tearable connection between them. Adjacent sections of the two parts are molded so as to be connected to each other at connection sections (280) at regular intervals.

The container (268) of the present embodiment includes a planar base (282) with two downward tapering cap formations (284) extending therefrom and defining cavities or sockets. The cap formations have the appearance of buckets, with an open top end at the planar base (282) and a blind bottom end. A rim (286) extends radially inwardly from the open top end of each cavity (284). The rims (286) are complementary to the locating discs (274).

To use the earplug set, a user may tear the connection sections (280) so as to separate adjacent parts of the cord (266). Then, the user may tear the thin connection between the adjacent parts of the cord to provide a single connection between each earplug and the connection points (278) at the container. The earplugs may then be used as is known.

When a user wishes to store the earplugs (262, 264), they may place the nose ends including the flanges of the earplugs (262, 264) into the cavities of the cap formations (284). The cavities (284) may receive the nose ends of the earplugs (262, 264) in a friction fit, as the flanges may engage the tapered side walls of the cap formations. In this embodiment, the locating disc (274) may be placed inside the cavities (284) so that the disc locates behind the complementarily-shaped rim (286), where it forms a shoulder. The rim functions as a locating member receiving formation. While the material that the earplug set is made of is resiliently deformable, the material will still be sufficiently stiff to enable the disc to retain the nose end of the earplugs in the cavity and prevent its accidental dislodgement therefrom. This may ensure that the earplug stays clean and hygienic during storage thereof. The ends of the stems (272) of the earplugs protrude through the open tops of the cavity, extending past the planar base (282). The earplugs may then be removed from the cavities (284) by pulling on the stems (272) when desired for use.

It should be noted that the locating disc of the present embodiment may also function as an additional flange, and may also block or attenuate sound waves from reaching a user's ears.

It is further envisaged that in the embodiment shown in FIGS. 23 and 24, a mechanism may be provided that allows the cavities to be at least partially closed when they are not being used to store the earplugs. This may prevent dust and other impurities to enter the cavities, where it may attach to the earplugs and render them unhygienic before a next use and replacement into a user's ear.

The mechanism may be, for example, a lid structure.

As for example the storage containers and cavities shown in FIGS. 13 and 14, where the storage container comprises two parts, each part defining a separate portion of a single cavity, the two parts of the container may be closed without the earplugs therein to at least partially prevent the interior of the cavities from collecting dust or other impurities. In the embodiment shown in FIGS. 17 and 18, an example is shown of a retaining formation in the form of attachment formations.

Instead, the mechanism of closure may involve a hinge or fold line provided between the two cap formations, permitting them to be hinged towards each other so that the two openings of the cap formations lie adjacent and/or abut each other, with each cap formation closing the other.

Any suitable retaining structure, for example a hook, loop and/or tab structure, may be provided to retain the cap formations and cavities adjacent one another. A similar closure structure may be provided with any of the other embodiments described above, and may also allow at least partial closure of the cap formations when they are not in use.

FIGS. 25 to 30 illustrate a further embodiment of an earplug set (300). The present embodiment incorporates components similar to those of the previously described embodiments, all of which components, in similar fashion, are integrally molded with one another. Thus, the set (300) includes two earplugs (302, 304) of the generally domed flange type, and a cord or lanyard (306) connecting the two earplugs. The cord is provided in the form of a generally planar cord body (72).

The set also includes a storage container (308). The configuration of the storage container (308) is less complex than that of the embodiments shown in FIGS. 17 to 19, however. Instead of a tab and slot arrangement as described in those embodiments, the locking means in this embodiment comprises a strap formation (310) in the form of an elongate loop of resiliently deformable material. The strap formation (310) includes a substantially planar web portion (312).

The storage container includes a pair of cap formations (314, 316), each of which defines a cavity for receiving one of the pair of earplugs. The strap formation (310) is connected to a first of the two cap formations (314) at two mutually spaced connection locations as shown in FIG. 25 (318, 320). The strap formation is integrally molded with the first cap formation (314).

Figure 33:
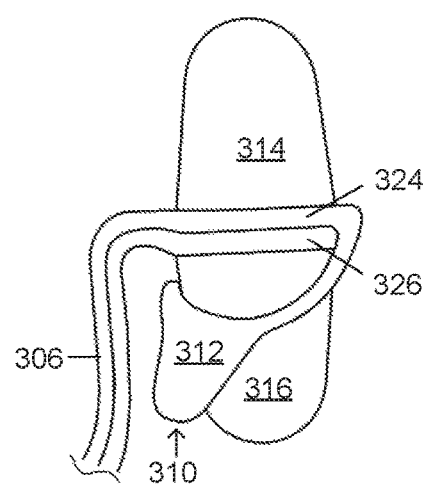
FIG. 33 illustrates, schematically, a side view of a storage container forming part of an earplug set similar to that of FIGS. 25 to 30, the container comprising two cap formations which are shown in a closed condition in which they have been folded over each other and secured adjacent each other by means of a strap formation.

When the storage container is not in use storing the earplugs, the two cap formations (314, 316) may be hinged towards each other about a resiliently deformable hinge or fold line (322) provided between them. The cap formations may be closed over each other in such a manner that the cavities which they define face each other. Thereafter, as best seen in FIG. 33, the strap formation (310) connected to the first cap formation (314) may be stretched over and around the second of the cap formations (316) to lock the two cap formations adjacent each other. Closure of the storage container in this manner may at least partially prevent dust or other impurities from collecting in the cavities, which could otherwise have been introduced to the flanges of the earplug during a next period of storage thereof.

As further shown in FIG. 33, when the cap formations (314, 316) are secured in their locked condition by the strap formation, two lips (324, 326) surrounding the mouths of the cap formations abut one another. Each cap formation accordingly serves as a lid to close the other. Thus, the need to have a separate lid for the storage container is obviated, as is the need to provide tabs, slots, stop formations and stop formation receiving apertures such as those indicated by reference numerals 184 and 188 in FIGS. 17 to 19.

The complexity of the construction and manufacture of the present embodiment is thus reduced by comparison with previously described embodiments. A simpler mold can be used with a concomitant reduction in costs.

In the locked condition of the storage container (308), the second cap formation (316) serves as a complementary strap formation engaging formation. It will be appreciated, however, that other engaging formations may be provided to engage with the strap formation. For example, instead of the second cap formation (316) itself serving as the engaging formation, a lip, flange, shoulder, stud or the like may be integrally molded with the second cap formation to serve that purpose. Other arrangements for locking the cap formations in their closed condition are also feasible and fall within scope of the present invention.

As shown in FIGS. 25 to 30, two resiliently deformable, generally U-shaped kink formations (328) may be provided, projecting outwardly from the planar web portion (312) of the strap formation. In use, these kink formations may permit the area of a footprint defined by the strap formation to be temporarily expanded so that the strap formation transitions from a compact resting conformation to an expanded conformation. The kink formations may thus permit a greater stretched length of the strap formation to be obtained yet preserve the more compact conformation of the strap formation at rest. The kink formations may additionally promote elasticity of the strap formation and permit additional lengthening thereof during stretching, thereby to facilitate passing the strap formation over and around the second cap formation for locking purposes. The U-shape of each kink formation may also permit the strap tension to be lessened when the strap formation is engaged.

In common with previously described embodiments, the earplugs (302, 304) of the earplug set (300) each comprises a body defining a stem (332, 334). Each stem furthermore provides a grip and sound dampening formations in the form of three generally hemispherically-shaped domed flanges. The integrally molded cord (306) extends laterally from the side of each stem (332, 334) in a direction transverse to the central longitudinal axis of the stem, instead of axially from the grip end of each earplug stem as seen in previously described embodiments.

During use of the earplugs (302, 304), the lateral mounting of the cord on the stem permits at least a portion of the cord to rest in contact with a user's earlobe and/or cheek. These parts of the user's body can then serve as vibration-damping surfaces which may limit the transmission of sound waves, vibrations and noise along the cord and into the user's ears. In preferred embodiments of the earplug sets, the region where the cord connects to the side of each stem is located towards the largest domed flange, thereby further to promote resting of the cord in contact with the earlobe and/or cheek of the user during use. Thus, in the embodiment shown, the cord is connected to the side of each stem (332, 334) at a distance of about 19 mm from the nose end of the corresponding stem. It will be appreciated that other suitable connection distances are feasible. Typically, although not necessarily exclusively, the location of connection to the stem will not exceed about 25 mm from the nose end, however.

The grip of each of the two earplugs includes four elongate ridges extending longitudinally along the length of the grip, which in combination have a generally cross-shaped cross-section. Two of the ridges are indicated by the reference numerals 336 and 338 in the drawings. The ridges are punctuated by a series of wall formations (340) which project generally transversely from and connect the ridges at intervals, thereby to delimit indentations or dimples in the grip. In the embodiment shown, the laterally mounted cord is connected to the third wall formation (340) on each grip, counting from the grip end. The scope of the invention is not limited to such a configuration, however.

The laterally mounted configuration of the cord (306) may permit less expensive polymers to be used for manufacturing of the earplug sets, whilst still allowing the volume of noises that may be transmitted along the cord during use to be restricted to a preferred lower range. Thus, the laterally mounted configuration may permit polymers with less favourable acoustic conductivity properties, to be used for manufacture, because some damping of the noise may be provided by the contact of the cord with the user's body surfaces as mentioned above.

The laterally mounted configuration of the cord (306) may also permit the diameter of pins used during molding of the earplugs to be larger than that of pins typically used in the manufacture of other types of earplugs. A larger diameter socket can be molded into the stem of the earplug. In the other types of earplug, by contrast, the allowable diameter of the pin and socket are constrained to a certain maximum size because of the necessity to fit a complementary cord into the socket. The larger pin size that is permitted by the laterally mounted configuration can promote more rapid cooling after molding, since the internal surface of the socket is nearer to the exterior surfaces of the earplug grip. This in turn can promote shorter cycling times during manufacture.

Four frangible bridge formations (342) connect the stems (332, 334) of the earplugs (302, 304) to the cord body (72) at separate locations. The locations are at the nose end and grip end of each stem in this embodiment. Each bridge formation extends between one of the earplugs and an innermost coil of the cord body. The earplugs may be thus be supported and stabilised by the cord body.

The inclusion of the frangible bridge formations (342) may promote mould-filling and keep the earplug sets neater during transport. To permit first use of the earplug set, the bridge formations (342) can be broken by the first user, thereby to disconnect the earplugs from the inner side of the cord body.

It will be apparent to a person skilled in the art that many modifications may be made to the embodiments described above without departing from the scope of the invention. Different aspects of the invention may be combined to provide embodiments incorporating any appropriate number of the aspects described herein.

A container may be provided that is integrally molded with an earplug set and which is collapsible onto itself in any suitable manner. This may be, for example, a concertina-like fashion or any self-compressing format in which the container can collapse onto itself.

It is envisaged that the mold in which earplugs of the present invention is manufactured may be configurable to allow an interchange of part. This may allow, for example, a switch between configurations of 3 or 2 flanges as desired based on a specific application. Additionally, a container and/or cord may be added to or removed from the mold as desired. This may reduce the overall cost of providing a plurality of different molds.

The cord length in embodiments of the present invention may be sufficiently long to prevent accidental ripping of the cord into two parts whilst converting it into its separated format and overextension thereof. A cord length of over 700 mm may be sufficient to achieve this. However, it should be noted that the elasticity of the material the cords are manufactured from may at least partially assist in preventing undesired ripping of the cord. To this end, a plastics material, such as a thermoplastic elastomer, may be selected to provide an adequate elasticity for the earplugs to function as desired. It is, however, envisaged that silicone rubber may also be used.

Earplugs and associated components of the present invention may be made metal detectable so that metal scanner may detect their presence on a person, for example if a person attempts to remove them from specific premises where they are not allowed to do so. Silver ion may be introduced into the earplugs and associated components to increase hygiene thereof.

While the above embodiments described with reference to the representations only illustrate earplugs with domed flanges, it is envisaged that substantially straight flanges may be equally suited for implementation with the aspects of the invention. The present invention may also be implemented in earplugs with adjustable attenuation. Some aspects of the invention may be usable with other types of earplugs, and not just flanged earplugs. In particular, the cord with sound reflecting formations may be used with any type of earplugs. The integrally molded cord and set of earplugs may be implemented with different types of corded earplugs, particularly foam earplugs, while the integrally molded container and cord may be suited for foam or any other type of corded earplugs.

Products of the present invention may also be branded, particularly on containers and/or planar members. Patent application numbers may also be embossed or debossed on the earplug set during molding, as shown, for example, in FIGS. 25 and 29.

The earplug sets and apparatuses described herein may present certain advantages over other earplug products.

For example, the need to have a ferrule or sleeve to cap the free end of each cord is obviated when the cord or lanyard is integrated with the earplug as in the present invention. Costs and complexity can be reduced as a result, since fewer components and manufacturing steps are required.

In addition, products according to the present invention may be marketed as more easily recyclable for the following reasons: (a) a single material is used in the process of molding multiple components; (b) the need to dismantle a set of earplugs into its constituent parts before recycling can be obviated since each set of earplugs is a single unit; and (c) the plastics materials from which the applicant's sets can be manufactured may overcome certain recycling difficulties experienced with certain other types of sets in which the cords are manufactured from polyvinyl-chloride (PVC).

As a result of fewer components used, the product may be lighter overall, which may lead to a reduction in electricity usage during manufacture.

As a further advantage, individual packaging may not be required depending on the type of product provided.

Throughout the specification and claims, unless the context requires otherwise, the following words and phrases shall have the following meanings:

the word "comprise" or variations such as "comprises" or "comprising" will be understood to imply the inclusion of a stated integer or group of integers but not the exclusion of any other integer or group of integers;

the word "domed" and variations thereof such as "dome" will be understood to have a wide scope encompassing, without limitation thereto, generally hemispherical, frustoconical, bell-shaped and/or bullet-shaped conformations;

the word "flange" and variations thereof will be understood to have a wide scope encompassing, without limitation thereto, any structure extending generally radially from an earplug stem and which is intended to engage the sides of an ear canal to secure the earplug therein; and the phrase "sound dampening member" will be understood to have a wide scope encompassing, without limitation thereto, any structure having sound dampening, sound abatement, sound attenuation and/or sound reduction properties, including sound absorption, scattering and/or reflection properties.

The inventiom claimed is:

1. A single-step process for injection molding an earplug set comprising two earplugs each having a stem providing a grip at one end and a nose at an opposite end with at least one sound dampening member provided towards the nose end, with a cord extending between the two earplugs to connect them together, the process comprising cooling and solidifying a thermoplastics material in a mold which defines cavities configured for injection molding the two earplugs and the cord, wherein said cavities are in communication with one another thereby to permit single-step integral injection molding of the two earplugs and the cord as a single unit made from a single material, and a cord molding cavity is configured to mold sides of a portion of the cord such that the sides adjoin to form a planar annular cord body which surrounds the two earplugs.

2. The process as claimed in claim 1 wherein the cord molding cavity is configured to mold the portion of the cord with adjoining sides such that the cord doubles back on itself.

3. The process as claimed in claim 2 wherein the cavities are positioned in the mold such that they are surrounded by the cord molding cavity.

4. The process as claimed in claim 1 wherein the cord molding cavity is configured to mold the sides of the portion of the cord to be defined by sulcations or lines of weakness which permit tearing of the planar annular cord body therealong to form the cord.

* * * * *